（12）United States Patent
Nakagami et al.

(10) Patent No.: US 11,405,644 B2
(45) Date of Patent: Aug. 2, 2022

(54) IMAGE PROCESSING APPARATUS AND METHOD

(71) Applicant: Sony Corporation, Tokyo (JP)

(72) Inventors: Ohji Nakagami, Tokyo (JP); Koji Yano, Tokyo (JP); Tsuyoshi Kato, Tokyo (JP); Satoru Kuma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/257,865

(22) PCT Filed: Jul. 19, 2019

(86) PCT No.: PCT/JP2019/028420
§ 371 (c)(1),
(2) Date: Jan. 5, 2021

(87) PCT Pub. No.: WO2020/026846
PCT Pub. Date: Feb. 6, 2020

(65) Prior Publication Data
US 2021/0297696 A1 Sep. 23, 2021

(30) Foreign Application Priority Data
Aug. 2, 2018 (JP) .............................. JP2018-145658

(51) Int. Cl.
H04N 19/597 (2014.01)
H04N 13/172 (2018.01)
(Continued)

(52) U.S. Cl.
CPC ......... *H04N 19/597* (2014.11); *H04N 13/172* (2018.05); *H04N 19/167* (2014.11);
(Continued)

(58) Field of Classification Search
None
See application file for complete search history.

(56) References Cited

U.S. PATENT DOCUMENTS 10,318,543 B1 * 6/2019 Sharifi .................. G06F 40/134
2020/0359053 A1 11/2020 Yano et al.
(Continued)

FOREIGN PATENT DOCUMENTS

| WO | 2018/034253 A1 | 2/2018 |
| WO | 2019/055963 A1 | 3/2019 |
| WO | 2019/142667 A1 | 7/2019 |

OTHER PUBLICATIONS

International Search Report and Written Opinion dated Oct. 15, 2019, received for PCT Application No. PCT/JP2019/028420, Filed on Jul. 19, 2019, 9 pages including English Translation.
(Continued)

*Primary Examiner* — Christopher Braniff
(74) *Attorney, Agent, or Firm* — Xsensus LLP

(57) ABSTRACT

An image processing apparatus and a method comprises generating a video frame that includes a patch obtained by projecting, onto a two dimensional plane, a point cloud that represents an object having a three-dimensional shape as a group of points; generating a thumbnail two-dimensional image, the thumbnail two-dimensional image being generated independently from the patch; embedding the thumbnail two-dimensional image into the video frame; and encoding the video frame to generate a bitstream.

19 Claims, 15 Drawing Sheets

(51) Int. Cl.
   *H04N 19/167* (2014.01)
   *H04N 19/184* (2014.01)
   *H04N 19/30* (2014.01)
   *H04N 19/70* (2014.01)

(52) U.S. Cl.
   CPC ........... *H04N 19/184* (2014.11); *H04N 19/30* (2014.11); *H04N 19/70* (2014.11)

(56) References Cited

U.S. PATENT DOCUMENTS

2021/0136414 A1* 5/2021 Oh .................... H04N 19/597
2021/0144404 A1* 5/2021 Aflaki Beni ......... H04N 19/174

OTHER PUBLICATIONS

Golla et al., "Real-time Point Cloud Compression", Dec. 17, 2015, pp. 5087-5092.

Jang et al., "Video-Based Point-Cloud-Compression Standard in MPEG: From Evidence Collection to Committee Draft", May 2019, pp. 118-123.

Mekuria et al., "Design, Implementation and Evaluation of a Point Cloud Codec for Tele-Immersive Video", Jan. 2016, pp. 1-14.

3DG, "PCC Test Model Category 2 v0", ISO/IEC JTC1/SC29/WG11 N17248, Oct. 2017, Macau, China, 11 pages.

Mammou et al., "Video-based and Hierarchical Approaches Point Cloud Compression", ISO/IEC JTC1/SC29/WG11 m41649, Oct. 2017, Macau, China, 3 pages.

A Vetro et al: "Overview of the Stereo and Multiview Video Coding Extensions of the H.264/MPEG-4 AVC Standard", Proceedings of the IEEE, vol. 99, No. 4, Apr. 1, 2011 (Apr. 1, 2011), pp. 626-642, XP055132298, ISSN: 0018-9219, DOI: 10.1109/JPROC.2010.2098830.

Khalad Mammou et al.: "Video-based and Hierarchical Approaches Point Cloud Compression." 120 MPEG Meeting: 2017023-2017027 ; MACAU (Motion Picture Expert Group or ISOSEC JTC 1/SC29/WG11) No. m41549 Jan. 2018 (Jan. 21, 2018).

Mary-Luc Champel, "Update onn TR," 118 MPEG Meeting, Apr. 3, 2017-Apr. 7, 2017 ; Hobart; (Motion Picture Expert Group or ISOSEC JTC1/SC29/WG11) No. m40668 Apr. 2, 2019 (Apr. 2, 2017).

* cited by examiner

FIG. 1

| | |
|---|---|
| | ADD INDEPENDENT 2D DATA TO BITSTREAM IN VIDEO-BASED APPROACH FOR 3D DATA |
| CONTENTS OF 2D DATA | RENDERED IMAGE OF 3D DATA |
| | IMAGE RENDERED WITH RECOMMENDED CAMERA WORK |
| | IMAGE RENDERED BY ENCODER |
| | REPEAT OF SAME VIEWPOINT, OR ADDITION OF DIFFERENT VIEWPOINT |
| LOCATION OF 2D DATA | VIDEO FRAME (COLOR VIDEO FRAME (TEXTURE VIDEO STREAM)) |
| | IN CASE OF MULTI-LAYER, ALL OR SOME OF LAYERS |
| SYNTAX FOR 2D DATA | 2D DATA PRESENCE/ABSENCE IDENTIFICATION INFORMATION |
| | 2D DATA SPATIAL POSITION MANAGEMENT INFORMATION |
| | 2D DATA TEMPORAL POSITION MANAGEMENT INFORMATION |
| | 2D DATA REPRODUCTION ASSISTING INFORMATION |
| ENCODING OF 2D DATA | INDEPENDENT ENCODING OF 2D DATA (INTO TILE, SLICE, OR PICTURE) |
| | CODING PARAMETER FOR 2D DATA |
| | EMBEDDING OF PLURALITY OF PIECES OF 2D DATA |

| 71 | | | |
|---|---|---|---|
| PCC_header () { | | | |
| ... | | | |
| thumbnail_available_flag | u(1) | WHETHER THERE IS 2D DATA | |
| if(thumbnail_available_flag) { | | | |
| num_rendering_view | u(8) | NUMBER OF RENDERED VIEWPOINTS | |
| InsertionMethod | u(8) | WHETHER INSERTION IS PERFORMED WITH LAYERS DIVIDED BY LayerID OR TemporalID | |
| SeparationID | u(8) | BREAK OF LayerID OR TemporalID | |
| IndependentDecodeFlag | u(1) | WHETHER 2D DATA CAN BE INDEPENDENTLY DECODED | |
| if(IndependentDecodeFlag) { | | | |
| MCTS_ID | u(8) | SPECIFICATION OF TILE (MCTS SEI) | |
| } | | | |
| } | | | |
| } | | | |

| default_display_window_flag | | u(1) |
|---|---|---|
| if(default_display_window_flag){ | | |
| def_disp_win_left_offset | 0 | ue(v) |
| def_disp_win_right_offset | 0 | ue(v) |
| def_disp_win_top_offset | 0 | ue(v) |
| def_disp_win_bottom_offset | 0 | ue(v) |
| } | | |

A

74

| frame_cropping_flag | 0 | u(1) |
|---|---|---|
| if(frame_cropping_flag){ | | |
| frame_crop_left_offset | 0 | ue(v) |
| frame_crop_right_offset | 0 | ue(v) |
| frame_crop_top_offset | 0 | ue(v) |
| frame_crop_bottom_offset | 0 | ue(v) |
| } | | |

B

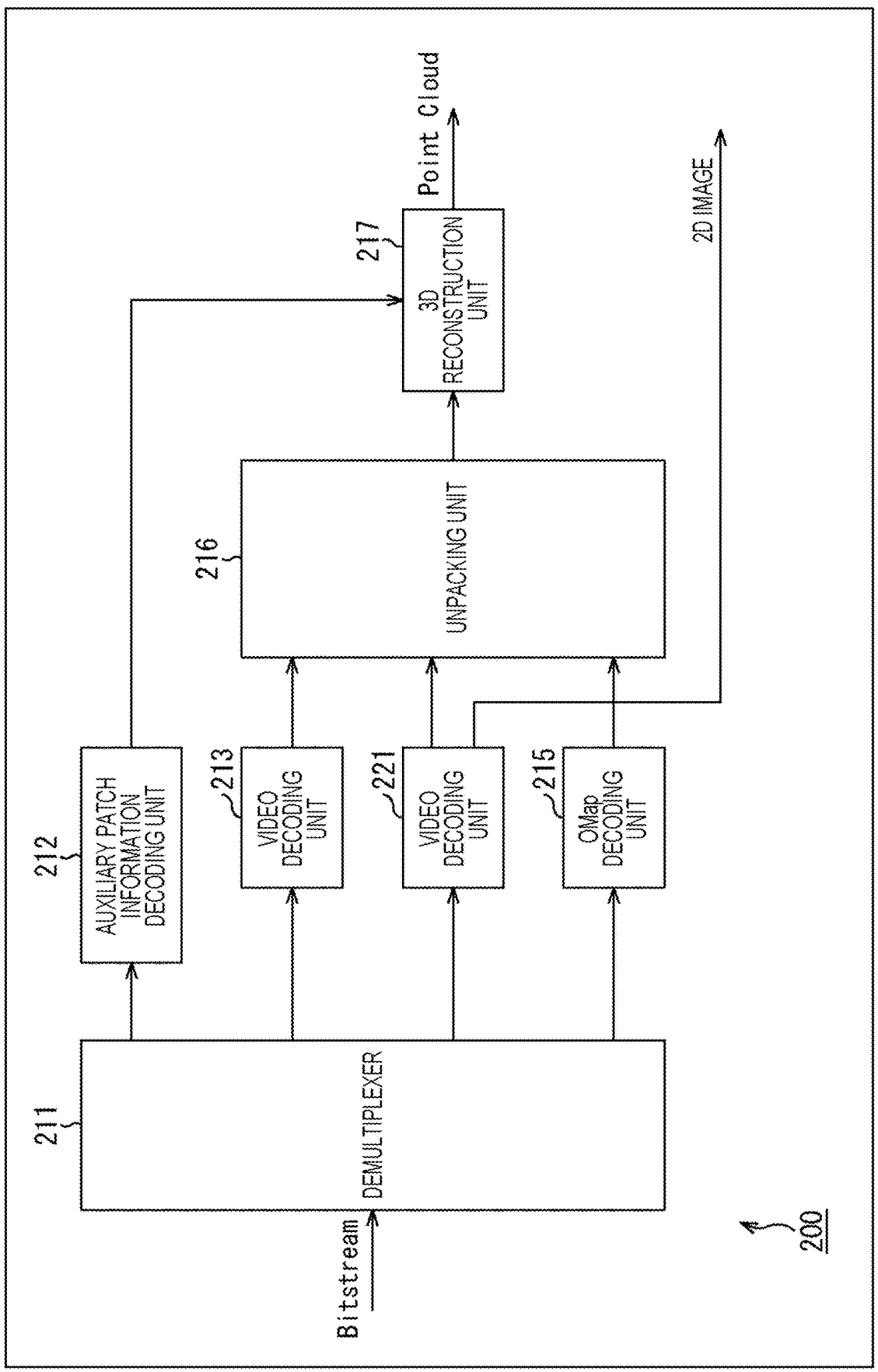

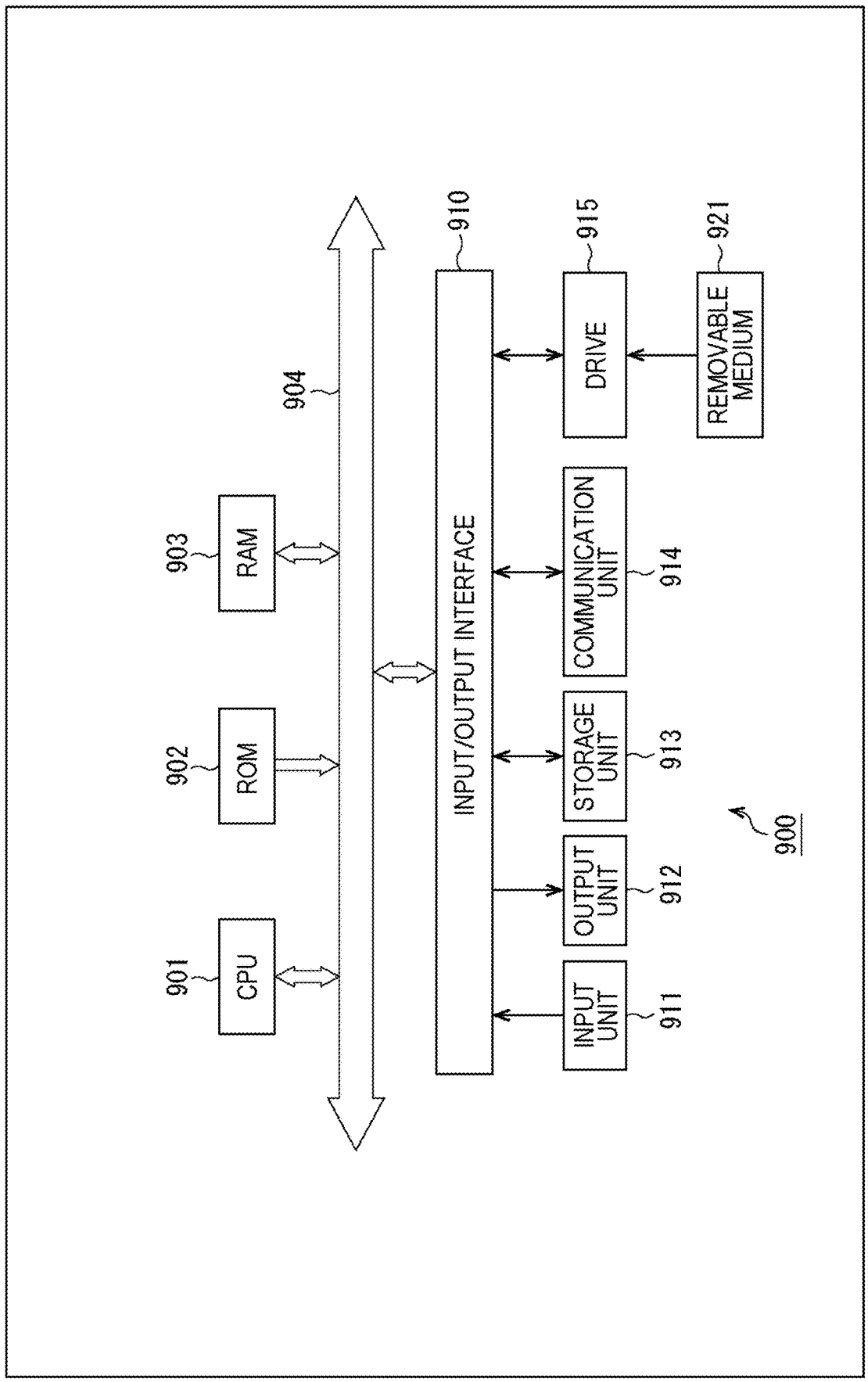

IMAGE PROCESSING APPARATUS AND METHOD

CROSS-REFERENCE TO RELATED APPLICATIONS

The present application is based on PCT filing PCT/JP2019/028420, filed Jul. 19, 2019, which claims priority to JP 2018-145658, filed Aug. 2, 2018, the entire contents of each are incorporated herein by reference.

TECHNICAL FIELD

The present disclosure relates to an image processing apparatus and a method, and more particularly to an image processing apparatus and a method that allow for easier reproduction of a two-dimensional image.

BACKGROUND ART

As an encoding method for 3D data representing an object having a three-dimensional shape such as a point cloud, there has conventionally been encoding using voxels such as Octree (see, for example, Non-Patent Document 1).

In recent years, as another encoding method, for example, an approach in which each of position information and color information of a point cloud is projected onto a two-dimensional plane for each subregion and encoded by an encoding method for two-dimensional images (hereinafter also referred to as a video-based approach) has been proposed (see, for example, Non-Patent Document 2 to Non-Patent Document 4).

The 3D data encoded as described above is, for example, transmitted as a bitstream and decoded. Then, the object having a three-dimensional shape is reproduced as a two-dimensional image just like an image captured with a camera at an optional position and orientation.

CITATION LIST

Non-Patent Document

Non-Patent Document 1: R. Mekuria, Student Member IEEE, K. Blom, P. Cesar., Member, IEEE, "Design, Implementation and Evaluation of a Point Cloud Codec for Tele-Immersive Video", tcsvt paper submitted february.pdf Non-Patent Document 2: Tim Golla and Reinhard Klein, "Real-time Point Cloud Compression", IEEE, 2015

Non-Patent Document 3: K. Mammou, "Video-based and Hierarchical Approaches Point Cloud Compression", MPEG m41649, October 2017

Non-Patent Document 4: K. Mammou, "PCC Test Model Category 2 v0", N17248 MPEG output document, October 2017

SUMMARY OF THE INVENTION

Problems to be Solved by the Invention

However, in a case of such a reproduction method, it is necessary to render an object having a three-dimensional shape indicated by decoded and reconstructed 3D data just like capturing an image with a camera at an optional position and orientation, and there has been a possibility that a processing load increases.

The present disclosure has been made in view of such circumstances, and is intended to allow for easier reproduction of a two-dimensional image.

Solutions to Problems

An image processing apparatus according to one aspect of the present technology includes a generation unit that generates a video frame that includes a patch obtained by projecting, onto a two-dimensional plane, a point cloud that represents an object having a three-dimensional shape as a group of points, and a two-dimensional image different from the patch, and a coding unit that encodes the video frame generated by the generation unit to generate a bitstream.

An image processing method according to the one aspect of the present technology includes generating a video frame that includes a patch obtained by projecting, onto a two-dimensional plane, a point cloud that represents an object having a three-dimensional shape as a group of points, and a two-dimensional image different from the patch, and encoding the generated video frame to generate a bitstream.

An image processing apparatus according to another aspect of the present technology includes an extraction unit that extracts, from a bitstream that includes coded data of a video frame that includes a patch obtained by projecting, onto a two-dimensional plane, a point cloud that represents an object having a three-dimensional shape as a group of points, and a two-dimensional image different from the patch, the coded data, and a two-dimensional decoding unit that decodes the coded data extracted from the bitstream by the extraction unit to restore the two-dimensional image.

An image processing method according to the other aspect of the present technology includes extracting, from a bitstream that includes coded data of a video frame that includes a patch obtained by projecting, onto a two-dimensional plane, a point cloud that represents an object having a three-dimensional shape as a group of points, and a two-dimensional image different from the patch, the coded data, and decoding the coded data extracted from the bitstream to restore the two-dimensional image.

In the image processing apparatus and the method according to the one aspect of the present technology, a video frame that includes a patch obtained by projecting, onto a two-dimensional plane, a point cloud that represents an object having a three-dimensional shape as a group of points, and a two-dimensional image different from the patch is generated, and the generated video frame is encoded and a bitstream is generated.

In the image processing apparatus and method according to the other aspect of the present technology, from a bitstream that includes coded data of a video frame that includes a patch obtained by projecting, onto a two-dimensional plane, a point cloud that represents an object having a three-dimensional shape as a group of points, and a two-dimensional image different from the patch, the coded data is extracted, and the coded data extracted from the bitstream is decoded and the two-dimensional image is restored.

Effects of the Invention

According to the present disclosure, images can be processed. In particular, a two-dimensional image can be reproduced more easily.

BRIEF DESCRIPTION OF DRAWINGS

FIG. 1 illustrates addition of 2D data to a bitstream.

FIG. 4 illustrates an example of syntax.

FIG. 6 illustrates an example of syntax.

FIG. 14 is a block diagram illustrating an example of a main configuration of a decoding device.

FIG. 15 is a block diagram illustrating an example of a main configuration of a computer.

MODE FOR CARRYING OUT THE INVENTION

Figure 2:
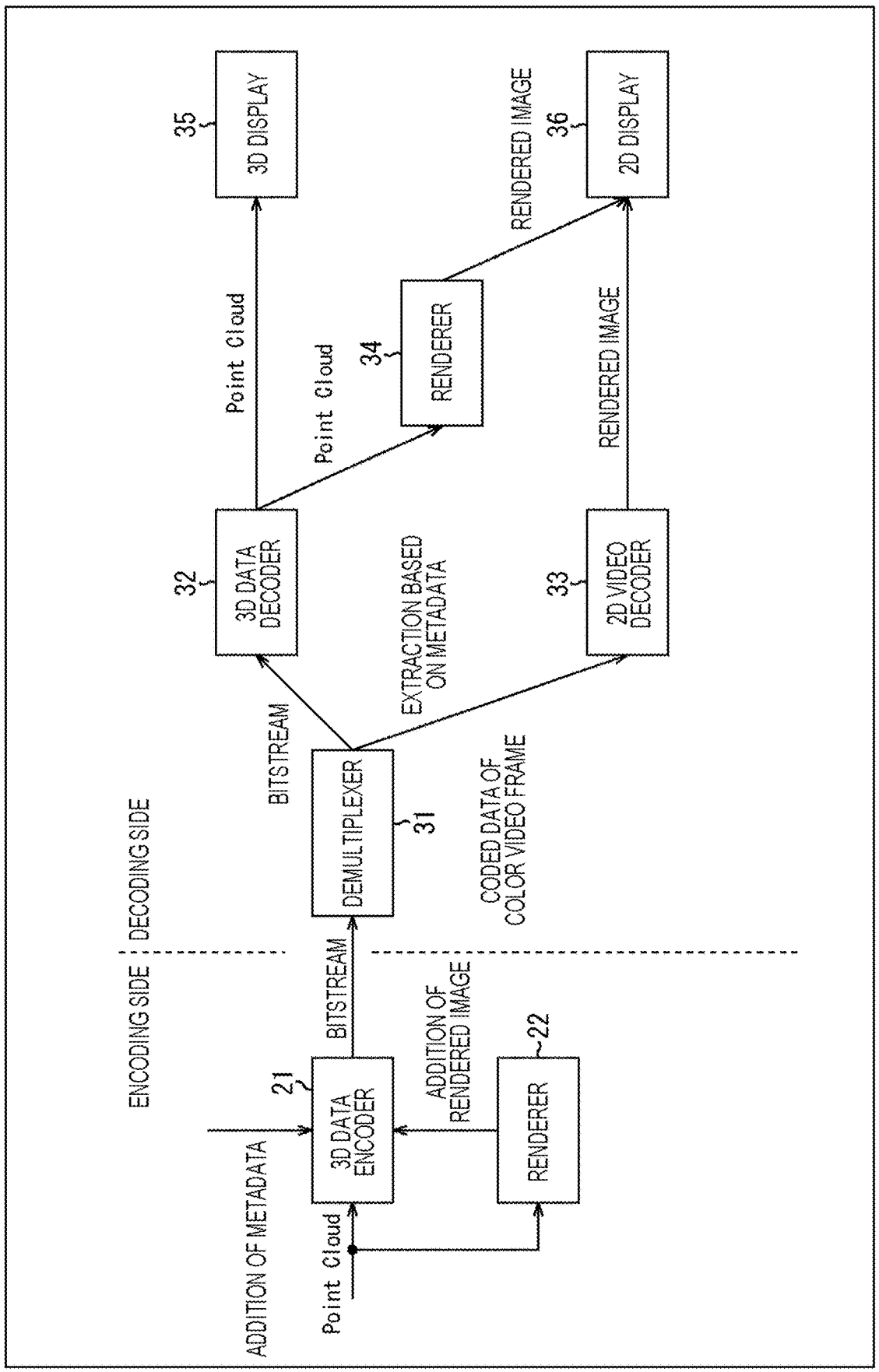
FIG. 2 illustrates an outline of a system.

Modes for carrying out the present disclosure (hereinafter referred to as "embodiments") will be described below. Note that the description will be made in the order below.

1. Addition of 2D data
2. First embodiment (coding device)
3. Second embodiment (decoding device)
4. Third embodiment (decoding device)
5. Note 1. Addition of 2D Data <Documents and the Like that Support Technical Contents and Terms>

The scope disclosed in the present technology includes not only the contents described in the embodiments but also the contents described in the following non-patent documents known at the time of filing.

Non-Patent Document 1: (described above)

Non-Patent Document 2: (described above)

Non-Patent Document 3: (described above)

Non-Patent Document 4: (described above)

Non-Patent Document 5: TELECOMMUNICATION STANDARDIZATION SECTOR OF ITU (International Telecommunication Union), "Advanced video coding for generic audiovisual services", H.264, April 2017

Non-Patent Document 6: TELECOMMUNICATION STANDARDIZATION SECTOR OF ITU (International Telecommunication Union), "High efficiency video coding", H.265, December 2016

Non-Patent Document 7: Jianle Chen, Elena Alshina, Gary J. Sullivan, Jens-Rainer, Jill Boyce, "Algorithm Description of Joint Exploration Test Model 4", JVET-G1001 v1, Joint Video Exploration Team (JVET) of ITU-T SG 16 WP 3 and ISO/IEC JTC 1/SC 29/WG 11 7th Meeting: Torino, IT, 13-21 Jul. 2017

That is, the contents described in the non-patent documents described above are also the basis for determining support requirements. For example, even in a case where a quad-tree block structure described in Non-Patent Document 6 and a quad tree plus binary tree (QTBT) block structure described in Non-Patent Document 7 are not directly described in the embodiments, they are included in the scope of the disclosure of the present technology and meet the support requirements of the claims. Furthermore, for example, technical terms such as parsing, syntax, and semantics are also included in the scope of the disclosure of the present technology and meet the support requirements of the claims even in a case where they are not direct described in the embodiments.

<Point Cloud>

There has conventionally been 3D data such as a point cloud representing an object having a three-dimensional shape on the basis of position information, attribute information, and the like of a group of points, and a mesh that is constituted by vertices, edges, and faces and defines an object having a three-dimensional shape using a polygonal representation.

For example, in the case of a point cloud, a three-dimensional structure (object having a three-dimensional shape) is represented as a set of a large number of points (group of points). That is, point cloud data is constituted by position information and attribute information (e.g., color) of each point in this group of points. Consequently, the data has a relatively simple structure, and any three-dimensional structure can be represented with sufficient accuracy with use of a sufficiently large number of points.

<Outline of Video-Based Approach>

A video-based approach has been proposed, in which a two-dimensional image is formed by projecting each of position information and color information of such a point cloud onto a two-dimensional plane for each subregion, and the two-dimensional image is encoded by an encoding method for two-dimensional images.

In this video-based approach, an input point cloud is divided into a plurality of segmentations (also referred to as regions), and each region is projected onto a two-dimensional plane. Note that data for each position of the point cloud (i.e., data for each point) is constituted by position information (geometry (also referred to as depth)) and attribute information (texture) as described above, and each region is projected onto a two-dimensional plane.

Then, each segmentation (also referred to as a patch) projected onto the two-dimensional plane is arranged to form a two-dimensional image, and is encoded by an encoding method for two-dimensional plane images such as Advanced Video Coding (AVC) or High Efficiency Video Coding (HEVC).

<Rendering>

The 3D data encoded as described above is, for example, encoded and transmitted as a bitstream to a transmission destination, where the 3D data is decoded and then reproduced. For example, in a case of a device having a 2D display that displays a two-dimensional image, an object having a three-dimensional shape indicated by decoded and reconstructed 3D data is rendered just like capturing an image with a camera at an optional position and orientation, and displayed on the 2D display as a two-dimensional image (also referred to as a rendered image).

Note that a two-dimensional image (rendered image) obtained by rendering an object as described above is different from a two-dimensional image (two-dimensional image in which patches are arranged) at the time of encoding. A two-dimensional image in which patches are arranged is a format for transmitting 3D data, and is not an image intended for display. That is, even if this two-dimensional image in which the patches are arranged is displayed, the displayed image cannot be understood by a user who views it (the image does not serve as content). On the other hand, a rendered image is an image that represents an object having a three-dimensional shape in two dimensions. Consequently, the image is displayed as an image that can be understood by a user who views it (the image serves as content).

However, in the case of this reproduction method, it is necessary to render an object having a three-dimensional shape. This rendering involves a large load, and there has been a possibility that a processing time increases. For example, in a case of checking the type of content data of a bitstream, it has been necessary to decode the bitstream, reconstruct 3D data, further render an object indicated by the 3D data, and reproduce the object as a two-dimensional image. Therefore, there has been a possibility that the time required to check the contents of the bitstream increases. Furthermore, for example, in a case where a recommended camera work (position, direction, or the like of a camera used for rendering) is specified on an encoding side, and a rendered image obtained by rendering the object with the recommended camera work is displayed on a decoding side, it is necessary to render the object on the decoding side, and there has been a possibility that the time required to display the rendered image increases.

Furthermore, the load of rendering is heavy, and there has been a possibility that only higher-performance devices can be equipped with a bitstream decoding/reproduction function. That is to say, there has been a possibility that the number of devices that cannot be equipped with the bitstream decoding/reproduction function increases (there has been a possibility that the number of devices that can be equipped with the bitstream decoding/reproduction function reduces).

<Addition of 2D Data>

Thus, as shown in the first row from the top of Table 10 in FIG. 1, in a video-based approach for 3D data on the encoding side, 2D data, which is different from the 3D data, is added to a bitstream. That is, data that can be displayed without the need for rendering is included in the bitstream of the 3D data.

Thus, on the decoding side, a two-dimensional image can be displayed (2D data included in a bitstream can be reproduced) without rendering of an object having a three-dimensional shape.

For example, in a case of displaying 3D data as three-dimensional content on a 3D display 35 on the decoding side in FIG. 2, a 3D data decoder 32 decodes a bitstream of the 3D data and reconstructs the 3D data (e.g., a point cloud). Then, the 3D display 35 displays the 3D data.

On the other hand, for example, in a case of displaying 3D data as a two-dimensional image on a 2D display 36 on the decoding side in FIG. 2, the 3D data decoder 32 decodes a bitstream of the 3D data and reconstructs the 3D data. Then, a renderer 34 renders the 3D data to generate a rendered image (two-dimensional image), and the 2D display 36 displays the rendered image. That is, in this case, rendering processing is required, and there has been a possibility that the load increases.

On the other hand, in a case where 2D data (e.g., a rendered image) has been added to a bitstream, a demultiplexer 31 extracts coded data of the 2D data from the bitstream, a 2D video decoder 33 decodes the coded data to generate a two-dimensional image, and the 2D display 36 can thus display the two-dimensional image. That is, the rendering processing on the decoding side can be skipped (omitted).

That is, a two-dimensional image can be displayed more easily. Consequently, for example, a two-dimensional image indicating contents of a bitstream can be included in the bitstream so that the two-dimensional image can be displayed without rendering of an object having a three-dimensional shape on the decoding side. Consequently, the contents of the bitstream can be checked more quickly. Furthermore, for example, a rendered image obtained with a recommended camera work can be added as 2D data to a bitstream, so that the rendered image can be displayed without rendering of an object having a three-dimensional shape on the decoding side. Consequently, the recommended camera work can be checked more quickly.

Furthermore, a two-dimensional image can be displayed without rendering of an object having a three-dimensional shape, which requires a heavy processing load, and this allows even lower-performance devices to reproduce 2D data included in a bitstream. Consequently, it is possible to suppress a reduction in the number of devices that cannot be equipped with the bitstream decoding/reproduction function (increase the number of devices that can be equipped with the bitstream decoding/reproduction function).

<Contents of 2D Data>

Note that contents of the 2D data added to the bitstream of the 3D data are optional as long as the contents are different from the patches of the 3D data. For example, as shown in the second row from the top of Table 10 in FIG. 1, the contents may be a rendered image of an object having a three-dimensional shape indicated by the 3D data.

For example, the contents may be a rendered image obtained by rendering the 3D data just like imaging the object having a three-dimensional shape indicated by the 3D data with a predetermined camera work (position, direction, or the like of the rendering camera). For example, when a 3D data encoder 21 encodes 3D data (point cloud) on the encoding side in FIG. 2, the 3D data encoder 21 may also encode a rendered image of the 3D data to be encoded to generate coded data, and the coded data of the rendered image may be added to a bitstream that includes coded data of the 3D data. That is, the rendered image may be added to the bitstream of the 3D data.

This allows the rendered image to be displayed on the decoding side without rendering (that is, more easily). For example, on the decoding side in FIG. 2, the demultiplexer 31 extracts coded data of a rendered image from a bitstream, and the 2D video decoder decodes the coded data, and thus the rendered image can be obtained. That is, the rendering processing can be skipped (omitted).

Furthermore, for example, as shown in the third row from the top of Table 10 in FIG. 1, this rendered image may be an image obtained by rendering just like imaging an object having a three-dimensional shape indicated by 3D data from a recommended camera position and direction. That is, this rendered image may be an image obtained by rendering with a recommended camera work.

For example, when the 3D data encoder 21 encodes 3D data (point cloud) on the encoding side in FIG. 2, the 3D data encoder 21 may also encode a rendered image obtained by rendering an object in the 3D data to be encoded with a recommended camera work to generate coded data, and the coded data of the rendered image may be added to a bitstream that includes coded data of the 3D data. That is, the rendered image obtained by rendering with the recommended camera work may be added to the bitstream of the 3D data.

This allows a rendered image obtained with a recommended camera work specified on the encoding side to be displayed on the decoding side without rendering (that is, more easily). For example, on the decoding side in FIG. 2, the demultiplexer 31 extracts coded data of a rendered image from a bitstream, and the 2D video decoder decodes the coded data, and thus the rendered image obtained with a recommended camera work specified on the encoding side can be obtained. That is, the rendering processing can be skipped (omitted).

Note that, for example, as shown in the fourth row from the top of Table 10 in FIG. 1, this rendered image may be generated on the encoding side. For example, on the encoding side in FIG. 2, a renderer 22 may render an object in 3D data to be encoded to generate a rendered image, and the 3D data encoder 21 may encode and add the rendered image to a bitstream of the 3D data.

This allows a rendered image generated on the encoding side to be displayed on the decoding side without rendering (that is, more easily). For example, on the decoding side in FIG. 2, the demultiplexer 31 extracts coded data of a rendered image from a bitstream, and the 2D video decoder decodes the coded data, and thus the rendered image generated by the renderer 22 can be obtained. That is, the rendering processing on the decoding side can be skipped (omitted).

Note that the 2D data is not limited to the example described above. This 2D data may not be a rendered image. For example, the 2D data may be an image including information (characters, numbers, symbols, figures, patterns, or the like) regarding contents of 3D data included in a bitstream. Such 2D data may be added to the bitstream so that the information regarding the contents of the 3D data can be more easily displayed on the decoding side. That is, a user on the decoding side can grasp the contents of the bitstream more quickly. Furthermore, the user can grasp the contents of the bitstream on a wider variety of devices.

Furthermore, the 2D data may be an image with contents independent of the 3D data included in the bitstream (an irrelevant image). For example, the 2D data may be a rendered image of an object different from the object indicated by the 3D data included in the bitstream, or may be an image including information (characters, numbers, symbols, figures, patterns, or the like) unrelated to the contents of the 3D data included in the bitstream. Such 2D data may be added to the bitstream so that a wider variety of information can be more easily displayed on the decoding side. That is, a user on the decoding side can obtain a wider variety of information more quickly. Furthermore, the user can obtain a wider variety of information on a wider variety of devices.

Furthermore, each of the 2D data and the 3D data may be a moving image or a still image. Moreover, the length of reproduction time of the 2D data and that of the 3D data may be the same as each other or may be different from each other. Such 2D data may be added to the bitstream so that the 2D data can be more easily displayed on the decoding side, regardless of whether the 2D data is a moving image or a still image. That is, a user on the decoding side can start viewing the 2D data more quickly, regardless of whether the 2D data is a moving image or a still image. Furthermore, the user can view the 2D data on a wider variety of devices, regardless of whether the 2D data is a moving image or a still image.

Furthermore, a plurality of pieces of 2D data may be added to the bitstream of the 3D data. Moreover, the lengths of reproduction time of the plurality of pieces of 2D data may be the same as each other or may be different from each other. Furthermore, the plurality of pieces of 2D data may be added to the bitstream in a state in which each of them is reproduced in sequence.

For example, a plurality of pieces of 2D data may be added to a bitstream in a state in which each of them is reproduced in sequence, so that the plurality of pieces of 2D data can be more easily reproduced in sequence on the decoding side. That is, a user on the decoding side can start viewing the plurality of pieces of 2D data more quickly. Furthermore, the user can view the plurality of pieces of 2D data on a wider variety of devices.

For example, as shown in the fifth row from the top of Table 10 in FIG. 1, the same moving image may be added to the bitstream a plurality of times as the plurality of pieces of 2D data. Thus, the moving image can be reproduced a plurality of times more easily on the decoding side. That is, a user on the decoding side can start viewing the moving image reproduced the plurality of times more quickly. Furthermore, the user can view the moving image reproduced the plurality of times on a wider variety of devices.

Furthermore, for example, as shown in the fifth row from the top of Table 10 in FIG. 1, as the plurality of pieces of 2D data, for example, moving images with contents that are different from each other may be added to the bitstream in a state in which each of them is reproduced in sequence. For example, as the moving images with contents that are different from each other, a plurality of rendered images (moving images) obtained by rendering with camera works (camera position, direction, or the like) that are different from each other may be added to the bitstream. Thus, the rendered images from a plurality of viewpoints (by a plurality of camera works) can be displayed (the rendered images from the corresponding viewpoints (by the corresponding camera works) can be displayed in sequence) more easily on the decoding side. That is, a user on the decoding side can start viewing the rendered images from the plurality of viewpoints more quickly. Furthermore, the user can view the rendered images from the plurality of viewpoints on a wider variety of devices.

<Location of 2D Data>

Note that 2D data may be added to any location in a bitstream. For example, the 2D data may be added to a video frame. As described above, a point cloud (3D data) is constituted by position information and attribute information of a group of points. Furthermore, in a case of the video-based approach, position information and attribute information of a point cloud are projected onto a two-dimensional plane for each segmentation and packed in a video frame as patches. The 2D data described above may be added to such a video frame.

Adding the 2D data to the video frame as described above makes it possible to encode the 2D data together with the 3D data. For example, in a case of FIG. 2, the 3D data encoder 21 encodes a packed video frame by an encoding method for two-dimensional plane images such as AVC or HEVC, thereby encoding 3D data and 2D data. That is, 2D data can be encoded more easily.

Furthermore, 2D data can be decoded more easily on the decoding side. For example, in the case of FIG. 2, the 2D video decoder 33 can generate 2D data by decoding coded data by a decoding method for two-dimensional plane images such as AVC or HEVC.

Figure 3:
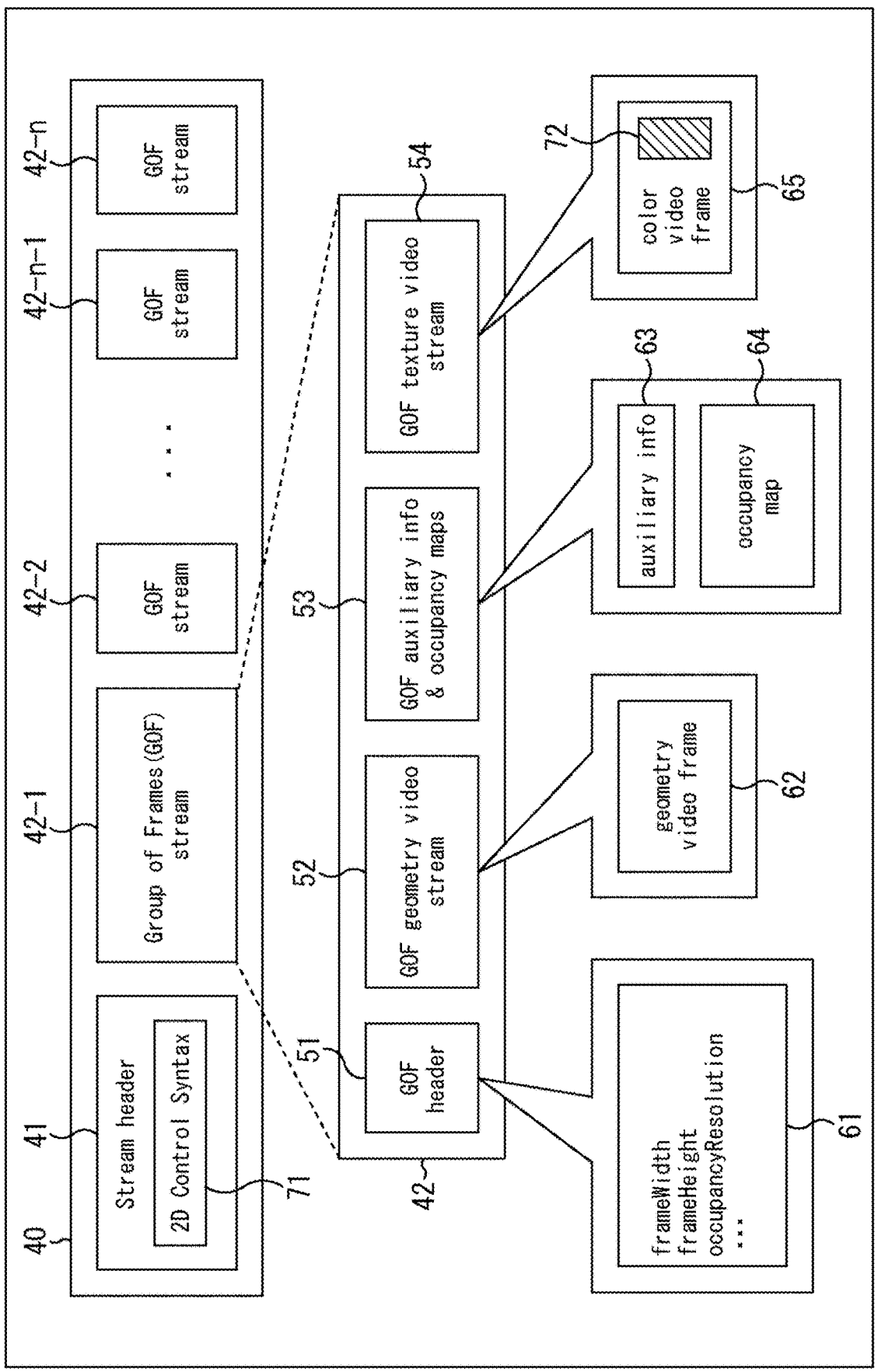
FIG. 3 illustrates an example of a camera parameter.

Note that, for example, as shown in the sixth row from the top of Table 10 in FIG. 1, 2D data may be added to a color video frame in which attribute information patches of a point cloud are packed. As illustrated in FIG. 3, a bitstream 40 of 3D data includes a stream header 41, a group of frames (GOF) stream 42-1, a GOF stream 42-2, . . . , a GOF stream 42-$n$-1, and a GOF stream 42-$n$ (n is an optional natural number).

The stream header 41 is header information of the bitstream 40, where various types of information regarding the bitstream 40 are stored.

Each of the GOF stream 42-1 to the GOF stream 42-n is created by packing correlations in a time direction in random access. That is, they are bitstreams for a predetermined length of time. In a case where it is not necessary to distinguish the GOF stream 42-1 to the GOF stream 42-n from each other in the description, they are referred to as GOF streams 42.

A GOF stream 42 includes a GOF header 51, a GOF geometry video stream 52, GOF auxiliary info & occupancy maps 53, and a GOF texture video stream 54.

The GOF header 51 includes parameters 61 for the corresponding GOF stream 42. The parameters 61 include parameters such as information regarding a frame height (frame Width), information regarding a frame width (frame-Height), and information regarding a resolution of an occupancy map (occupancyResolution), for example.

The GOF geometry video stream 52 is coded data (bitstream) obtained by encoding, by an encoding method for two-dimensional plane images such as AVC or HEVC, a geometry video frame 62 in which position information patches of a point cloud are packed, for example.

The GOF auxiliary info & occupancy maps 53 are coded data (bitstream) in which auxiliary info and an occupancy map 64 are encoded by a predetermined encoding method. The occupancy map 64 is map information that indicates whether or not there are position information and attribute information at each position on a two-dimensional plane.

The GOF texture video stream 54 is coded data (bitstream) obtained by encoding a color video frame 65 by an encoding method for two-dimensional plane images such as AVC or HEVC, for example. This color video frame 65 may have 2D data 72 added.

With such a configuration, 2D data can be encoded together with 3D data. For example, in the case of FIG. 2, the 3D data encoder 21 encodes a packed color video frame by an encoding method for two-dimensional plane images such as AVC or HEVC, thereby encoding not only attribute information of a point cloud but also 2D data. That is, 2D data can be encoded more easily.

Furthermore, 2D data can be decoded more easily on the decoding side. For example, in the case of FIG. 2, the demultiplexer 31 extracts coded data of a color video frame (the GOF texture video stream 54 in the case of the example in FIG. 3) from a bitstream, and the 2D video decoder 33 decodes the extracted coded data (the GOF texture video stream 54) by a decoding method for two-dimensional plane images such as AVC or HEVC, and thus 2D data (the 2D data 72 in the case of the example in FIG. 3) can be generated.

Note that, in this case, the 2D data 72 is information different from a point cloud, and the 2D data 72 is not reflected in the occupancy map 64. Consequently, for example, in a case where the 3D data decoder 32 (FIG. 2) decodes the bitstream 40 of the 3D data, the 2D data 72 is ignored. That is, the 3D data decoder 32 can decode the bitstream 40 in a similar manner to a case of decoding a bitstream of 3D data to which 2D data is not added. That is, 3D data can be easily decoded.

Furthermore, 2D data may be added to all color video frames, or may be added to some of the video frames. For example, as shown in the seventh row from the top of Table 10 in FIG. 1, in a case where color video frames are hierarchically encoded in the time direction, 2D data may be added to video frames of all layers to be encoded, or the 2D data may be added to video frames of some of the layers to be encoded.

In a case of the video-based approach, a predetermined number of two-dimensional images may be generated from one point cloud frame so that a patch depth can be represented. In other words, a plurality of patches can be generated in a depth direction for one point cloud frame. In that case, a packed video frame can be hierarchically encoded in the time direction, and a layer to be encoded can be assigned to each position in the patch depth direction (each patch can be arranged in a video frame of a layer corresponding to the depth direction).

In a case of such a layered structure, for example, when 2D data is added to all color video frames of 3D data in order from the first frame, there is a possibility that the 2D data may not be added to color video frames that come later in the encoding/decoding order. That is, when 2D data is extracted from all color video frames of 3D data and displayed, there is a possibility that video frames that come later in the encoding/decoding order may become a noise image (an image that is not 2D data).

Thus, 2D data may be added only to color video frames of some of the layers to be encoded in the layered structure described above, and the color video frames of all the layers to be encoded may be encoded in accordance with the layered structure, and then the 2D data may be reproduced by decoding only coded data of the color video frames of the layers to be encoded to which the 2D data has been added. For example, 2D data may be added to a color video frame of one layer to be encoded, and the color video frames of all the layers to be encoded may be encoded in accordance with the layered structure, and then the 2D data may be reproduced by decoding only coded data of the color video frame of the layer to be encoded to which the 2D data has been added. Thus, the 2D data can be extracted from all the decoded color video frames, and this prevents the noise image described above from being displayed.

Furthermore, the 2D data may be added to the color video frames of all the layers to be encoded in the layered structure described above. For example, the 2D data may be added to all the color video frames in the layered structure to be encoded, in order from the first frame. In that case, the same 2D data may be added repeatedly. For example, when an image of the last frame of a two-dimensional moving image has been added to a certain color video frame, the images of the 2D data may be added again to the subsequent color video frames from the first frame. Thus, the 2D data can be extracted from all the decoded color video frames, and this prevents the noise image described above from being displayed.

For example, in a case where 2D data is used as rendered images of 3D data, each of rendered images obtained by rendering by a predetermined camera work may be added to color video frames of all layers in order from the first frame, and after the last rendered image has been added, the rendered images once added may be added to the remaining color video frames in order from the first rendered image. Thus, one rendered image, which is a moving image, can be repeatedly displayed on the decoding side.

Furthermore, new 2D data may be added. For example, when an image of the last frame of a two-dimensional moving image has been added to a certain color video frame, images of new 2D data may be added to the subsequent color video frames from the first frame. Thus, the 2D data can be extracted from all the decoded color video frames, and this prevents the noise image described above from being displayed.

For example, in a case where 2D data is used as rendered images of 3D data, each of rendered images obtained by rendering by a predetermined camera work may be added to color video frames of all layers in order from the first frame, and after the last rendered image has been added, each of rendered images obtained by rendering by a new camera work may be added to the remaining color video frames in order. Thus, a plurality of rendered images, which are moving images, can be displayed in sequence on the decoding side.

Note that, in a similar manner, in a case where color video frames are hierarchically encoded in a scalable manner, 2D data may be added to video frames of all layers, or the 2D data may be added to video frames of some of the layers.

Note that the 2D data may be added to other than color video frames. For example, the 2D data may be added to geometry video frames.

<Syntax for 2D Data>

Information regarding 2D data to be added to a bitstream of 3D data as described above may be further included in the bitstream. This information regarding the 2D data may be any information.

Furthermore, the information regarding the 2D data may be added to any position in the bitstream. For example, the information regarding the 2D data may be added to a header of the bitstream as metadata. For example, as illustrated in FIG. 3, the information regarding the 2D data may be added as 2D control syntax 71 to the stream header 41 of the bitstream 40.

For example, as shown in the eighth row from the top of Table 10 in FIG. 1, information regarding a two-dimensional image may include two-dimensional image presence/absence identification information that indicates whether or not a bitstream includes two-dimensional image data.

FIG. 4 illustrates an example of the 2D control syntax 71. As illustrated in FIG. 4, thumbnail_available_flag may be transmitted as the 2D control syntax 71. The thumbnail_available_flag is flag information (i.e., two-dimensional image presence/absence identification information) that indicates whether or not there is 2D data in the bitstream (whether or not 2D data has been added). If this flag information is true (e.g., "1"), it indicates that there is 2D data in the bitstream. Furthermore, if this flag information is false (e.g., "0"), it indicates that there is no 2D data in the bitstream.

Furthermore, for example, as shown in the 11th row from the top of Table 10 in FIG. 1, the information regarding the two-dimensional image may include two-dimensional image reproduction assisting information for assisting reproduction of the two-dimensional image. For example, if the thumbnail_available_flag is true (if (thumbnail_available_flag) {), num_rendering_view, InsertionMethod, SeparationID, and IndependentDecodeflag may be transmitted as the 2D control syntax 71. These syntaxes are two-dimensional image reproduction assisting information for assisting reproduction of a two-dimensional image.

The num_rendering_view is information indicating the number of rendered viewpoints (the number of camera works). The InsertionMethod is information indicating whether 2D data has been added with layers divided by LayerID or TemporalID, or the 2D data has been added by repeat or the like (whether the 2D data has been added to all the layers). Note that, in a case where the 2D data has been added with the layers divided by LayerID or TemporalID, it is necessary to change an operation of an AVC or HEVC decoder. That is, the operation of the decoder can be changed on the basis of this information. The SeparationID is information indicating a break of LayerID or TemporalID. This information may be passed to the AVC or HEVC decoder so that only a specific layer can be displayed.

The IndependentDecodeflag is flag information that indicates whether or not a 2D data portion can be independently decoded by a tile or the like. If this flag information is true (e.g., "1"), it indicates that the 2D data can be independently decoded. Furthermore, if this flag information is false (e.g., "0"), it indicates that the 2D data cannot be independently decoded.

Furthermore, if the IndependentDecodeflag is true (if (IndependentDecodeflag) {), MCTS_ID may be transmitted as the 2D control syntax 71. The MCTS_ID is information for identifying a tile to be specified for decoding of a specific tile portion defined separately in motion-constrained tile sets supplemental enhancement information (MCTS SEI).

As a matter of course, the syntaxes illustrated in FIG. 4 are examples, and the 2D control syntax 71 may include any syntax.

Figure 5:
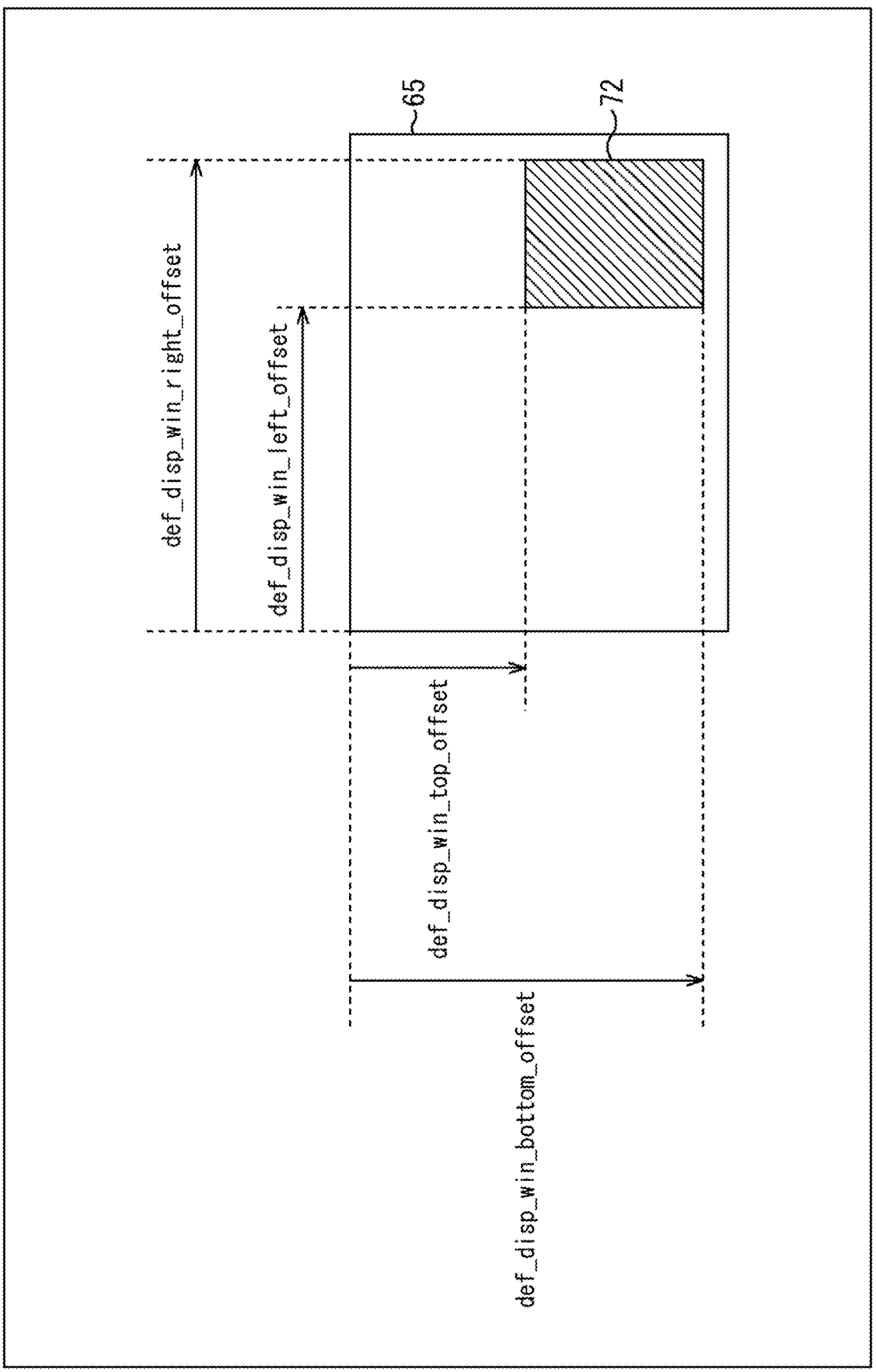
FIG. 5 illustrates an example of syntax.

Furthermore, for example, as shown in the ninth row from the top of Table 10 in FIG. 1, the information regarding the two-dimensional image may include two-dimensional image spatial position management information for managing a position in a spatial direction to which the two-dimensional image has been added. For example, as illustrated in FIG. 5, def_disp_win_left_offset, def_disp_win_right_offset, def_disp_win_top_offset, and def_disp_win_bottom_offset may be transmitted. These syntaxes are two-dimensional image spatial position management information for managing the position in the spatial direction to which the two-dimensional image has been added.

The def_disp_win_left_offset is information indicating an offset of the left edge of the 2D data 72 using, as a reference, the left edge of the color video frame 65. The def_disp_win_right_offset is information indicating an offset of the right edge of the 2D data 72 using, as a reference, the left edge of the color video frame 65. The def_disp_win_top_offset is information indicating an offset of the top edge of the 2D data 72 using, as a reference, the top edge of the color video frame 65. The def_disp_win_bottom_offset is information indicating an offset of the bottom edge of the 2D data 72 using, as a reference, the top edge of the color video frame 65. That is, the position of the added 2D data can be identified from these pieces of information. That is, a decoder can more easily extract the 2D data added to the color video frame on the basis of these pieces of information. That is, 2D data can be reproduced more easily.

Note that these pieces of information (def_disp_win_offset) are specified in HEVC. For example, these pieces of information are transmitted as syntaxes as illustrated in A of FIG. 6. That is, 2D data can be reproduced more easily by using an HEVC decoder.

Note that, in a case where AVC is used for encoding/decoding of a video frame, Cropping_offset specified in AVC may be used instead of these pieces of information. For example, the Cropping_offset may be transmitted as syntax as illustrated in B of FIG. 6. Thus, 2D data can be reproduced more easily by using an AVC decoder.

Figure 7:
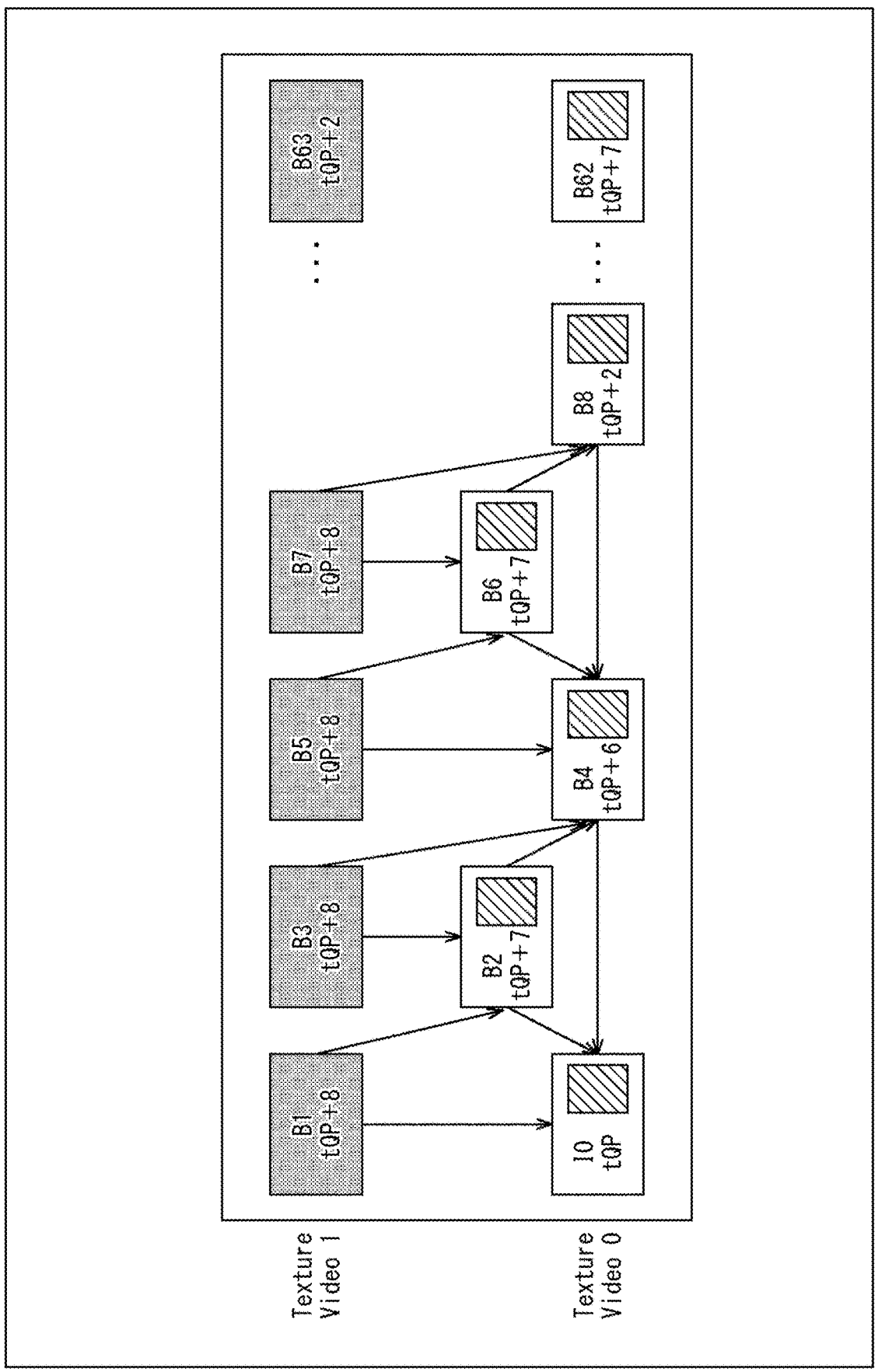
FIG. 7 illustrates an example of adding 2D data.

Furthermore, for example, as shown in the 10th row from the top of Table 10 in FIG. 1, the information regarding the two-dimensional image may include two-dimensional image temporal position management information for managing a position in a time direction to which the two-dimensional image has been added. For example, a case is assumed in which color video frames are hierarchically encoded in the time direction as illustrated in FIG. 7. In this case, the TemporalID may be used to add 2D data only to color video frames of some of the layers. That is, this TemporalID is two-dimensional image temporal position management information for managing the position in the time direction to which the two-dimensional image has been added.

For example, a case is assumed in which color video frames are two-layered as illustrated in FIG. 7. In this case, 2D data is added to video frames in the lower layer, Video 0, and TemporalID=0 is set, while 2D data is not added to video frames in the upper layer, Video 1, and TemporalID=1 is set. Thus, on the basis of the TemporalID, a decoder can decode only video frames in a layer to which 2D data has been added (in the case of the example in FIG. 7, the video frames in the Video 0 layer). Consequently, reproduction of a noise image can be prevented more easily. Note that LayerID may be used instead of the TemporalID.

Note that the above-described two-dimensional image spatial position management information and two-dimensional image temporal position management information may be included in, for example, a GOF texture video stream. Thus, a decoder can easily reproduce the 2D data by decoding the GOF texture video stream.

For example, in FIG. 2, the demultiplexer 31 extracts coded data (GOF texture video stream) of a color video frame from a bitstream on the basis of metadata (e.g., the 2D control syntax 71), and supplies the coded data to the 2D video decoder 33. The 2D video decoder 33 can obtain a rendered image by decoding the GOF texture video stream and extracting 2D data.

<Encoding of 2D Data>

For example, as shown in the 12th row from the top of Table 10 in FIG. 1, 2D data added to a color video frame may be encoded independently only for that portion (independently of patches and the like). That is, the 2D data added to the color video frame may be able to be decoded independently only for that portion (independently of the patches and the like). In other words, the 2D data may be added to the video frame as a unit of data that can be independently encoded/decoded, such as a tile, a slice, or a picture.

Thus, a decoder (e.g., the 2D video decoder 33) can obtain the 2D data by decoding only the 2D data portion of the GOF texture video stream. Consequently, it is possible to suppress an increase in decoding load (reduce the decoding load).

Furthermore, in a case where 2D data is encoded/decoded independently as described above, for example, as shown in the 13th row from the top of Table 10 in FIG. 1, a coding parameter for the 2D data (a coding parameter set independently of other regions) may be used to encode/decode the 2D data. Thus, a coding parameter more suitable for the 2D data can be used, and it is therefore possible to suppress a reduction in coding efficiency (improve the coding efficiency). Furthermore, it is possible to suppress a reduction in subjective image quality of 2D data (improve the subjective image quality).

Note that the number of pieces of 2D data that can be added into one video frame is optional. For example, as shown in the 14th row from the top of Table 10 in FIG. 1, a plurality of pieces of 2D data may be added into one video frame.

2. First Embodiment

<Coding Device>

Figure 8:
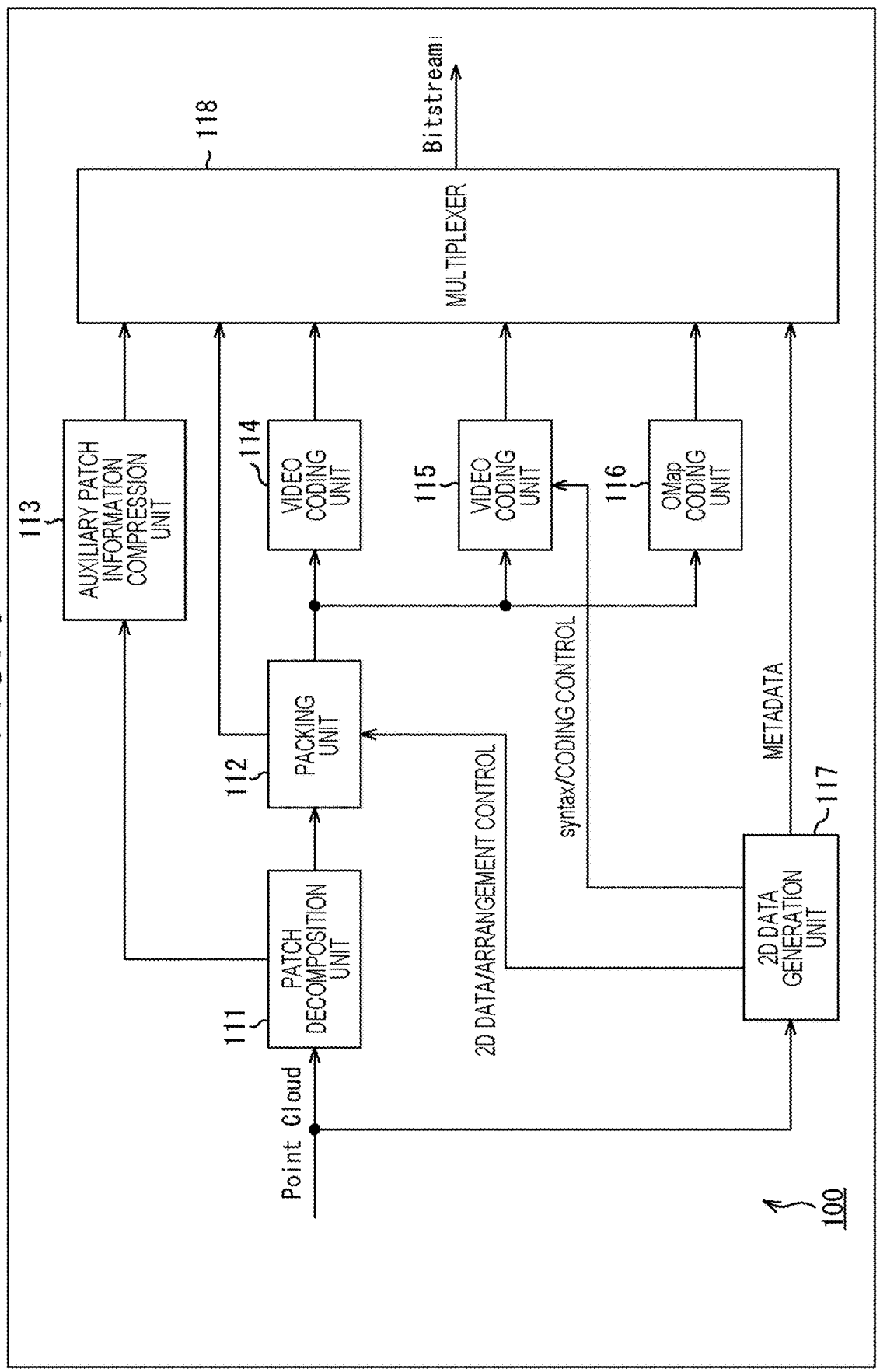
FIG. 8 is a block diagram illustrating an example of a main configuration of a coding device.

Next, a configuration that enables addition of 2D data as described above will be described. FIG. 8 is a block diagram illustrating an example of a configuration of a coding device, which is an aspect of an image processing apparatus to which the present technology is applied. A coding device 100 illustrated in FIG. 8 is a device (a coding device to which a video-based approach is applied) that projects 3D data such as a point cloud onto a two-dimensional plane and performs encoding by an encoding method for two-dimensional images.

Note that FIG. 8 illustrates a main part of processing units, a data flow, and the like, and not all of them are illustrated in FIG. 8. That is, the coding device 100 may include a processing unit that is not illustrated as a block in FIG. 8, or may involve a flow of processing or data that is not illustrated as an arrow or the like in FIG. 8. This also applies to other drawings for describing processing units and the like in the coding device 100.

As illustrated in FIG. 8, the coding device 100 includes a patch decomposition unit 111, a packing unit 112, an auxiliary patch information compression unit 113, a video coding unit 114, a video coding unit 115, an OMap coding unit 116, a 2D data generation unit 117, and a multiplexer 118.

The patch decomposition unit 111 performs processing related to decomposition of 3D data. For example, the patch decomposition unit 111 acquires 3D data (e.g., point cloud) representing a three-dimensional structure input to the coding device 100. Furthermore, the patch decomposition unit 111 decomposes the acquired point cloud into a plurality of segmentations, projects the point cloud onto a two-dimensional plane for each segmentation, and generates position information patches and attribute information patches. The patch decomposition unit 111 supplies information regarding each generated patch to the packing unit 112. Furthermore, the patch decomposition unit 111 supplies auxiliary patch information, which is information regarding the decomposition, to the auxiliary patch information compression unit 113.

The packing unit 112 performs processing related to data packing. For example, the packing unit 112 acquires, from the patch decomposition unit 111, information regarding a patch of position information (geometry) indicating a position of a point and information regarding a patch of attribute information (texture) such as color information added to the position information.

Furthermore, the packing unit 112 arranges each of the acquired patches on a two-dimensional image and packs them as a video frame. For example, the packing unit 112 arranges position information patches on a two-dimensional image and packs them as a position information video frame (also referred to as a geometry video frame). Furthermore, for example, the packing unit 112 arranges attribute information patches on a two-dimensional image and packs them as an attribute information video frame (also referred to as a color video frame).

Note that the packing unit 112 is controlled by the 2D data generation unit 117 to add, to a predetermined position in a color video frame, 2D data supplied from the 2D data generation unit 117 (e.g., a rendered image of an object having a three-dimensional shape represented by a point cloud input to the coding device 100) by a method as described above in <1. Addition of 2D data>.

Furthermore, the packing unit 112 generates an occupancy map corresponding to these video frames. Moreover, the packing unit 112 performs dilation processing on a color video frame.

The packing unit 112 supplies the geometry video frame generated as described above to the video coding unit 114. Furthermore, the packing unit 112 supplies the color video frame generated as described above to the video coding unit 115. Moreover, the packing unit 112 supplies the occupancy map generated as described above to the OMap coding unit 116. Furthermore, the packing unit 112 supplies such control information regarding packing to the multiplexer 118.

The auxiliary patch information compression unit 113 performs processing related to compression of auxiliary patch information. For example, the auxiliary patch information compression unit 113 acquires data supplied from the patch decomposition unit 111. The auxiliary patch information compression unit 113 encodes (compresses) auxiliary patch information included in the acquired data. The auxiliary patch information compression unit 113 supplies coded data of the obtained auxiliary patch information to the multiplexer 118.

The video coding unit 114 performs processing related to encoding of a video frame of position information (geometry). For example, the video coding unit 114 acquires a geometry video frame supplied from the packing unit 112. Furthermore, the video coding unit 114 encodes the acquired geometry video frame by an optional encoding method for two-dimensional images such as AVC or HEVC. The video coding unit 114 supplies coded data (coded data of the geometry video frame) obtained by the encoding to the multiplexer 118.

The video coding unit 115 performs processing related to encoding of a video frame of attribute information (texture). For example, the video coding unit 115 acquires a color video frame supplied from the packing unit 112. Furthermore, the video coding unit 115 encodes the acquired color video frame (e.g., a color video frame to which 2D data has been added) by an optional encoding method for two-dimensional images such as AVC or HEVC.

At that time, the video coding unit 115 encodes the color video frame under the control of the 2D data generation unit 117 by a method as described above in <1. Addition of 2D data>. Furthermore, the video coding unit 115 adds, to coded data (bitstream) of the color video frame, metadata such as syntax supplied from the 2D data generation unit 117 as described above in <1. Addition of 2D data>. The video coding unit 115 supplies the coded data (the coded data of the color video frame) obtained by the encoding to the multiplexer 118.

The OMap coding unit 116 performs processing related to encoding of an occupancy map. For example, the OMap coding unit 116 acquires an occupancy map supplied from the packing unit 112. Furthermore, the OMap coding unit 116 encodes the acquired occupancy map by an optional encoding method such as arithmetic coding. The OMap coding unit 116 supplies coded data (coded data of the occupancy map) obtained by the encoding to the multiplexer 118.

The 2D data generation unit 117 performs processing related to 2D data generation as described above in <1. Addition of 2D data>. For example, the 2D data generation unit 117 acquires a point cloud (3D data) input to the coding device 100. The 2D data generation unit 117 renders an object having a three-dimensional shape represented by the point cloud and generates a rendered image (2D data). Furthermore, the 2D data generation unit 117 also generates information regarding the 2D data.

The 2D data generation unit 117 supplies the generated 2D data to the packing unit 112, and controls arrangement of the 2D data. Furthermore, the 2D data generation unit 117 supplies information regarding the generated 2D data (syntax or the like) to the video coding unit 115, and controls encoding of a color video frame. Moreover, the 2D data generation unit 117 supplies the information regarding the generated 2D data as metadata to the multiplexer 118.

The multiplexer 118 performs processing related to bitstream generation (information multiplexing). For example, the multiplexer 118 acquires coded data of auxiliary patch information supplied from the auxiliary patch information compression unit 113. Furthermore, the multiplexer 118 acquires control information regarding packing supplied from the packing unit 112. Moreover, the multiplexer 118 acquires coded data of a geometry video frame supplied from the video coding unit 114. Furthermore, the multiplexer 118 acquires coded data of a color video frame supplied from the video coding unit 115. Moreover, the multiplexer 118 acquires coded data of an occupancy map supplied from the OMap coding unit 116. Furthermore, the multiplexer 118 acquires metadata supplied from the 2D data generation unit 117.

The multiplexer 118 multiplexes the acquired information to generate a bitstream. That is, the multiplexer 118 generates a bitstream that includes coded data of 3D data and 2D data, and information regarding the 2D data. The multiplexer 118 outputs the bitstream to outside of the coding device 100 (transmits it to the decoding side).

As described above, in the video-based approach for 3D data, the coding device 100 adds 2D data, which is different from the 3D data, to the bitstream. Therefore, as described above in <1. Addition of 2D data>, a two-dimensional image can be displayed (2D data included in a bitstream can be reproduced) without rendering of an object having a three-dimensional shape on the decoding side. That is, a two-dimensional image can be reproduced more easily.

<2D Data Generation Unit>

Figure 9:
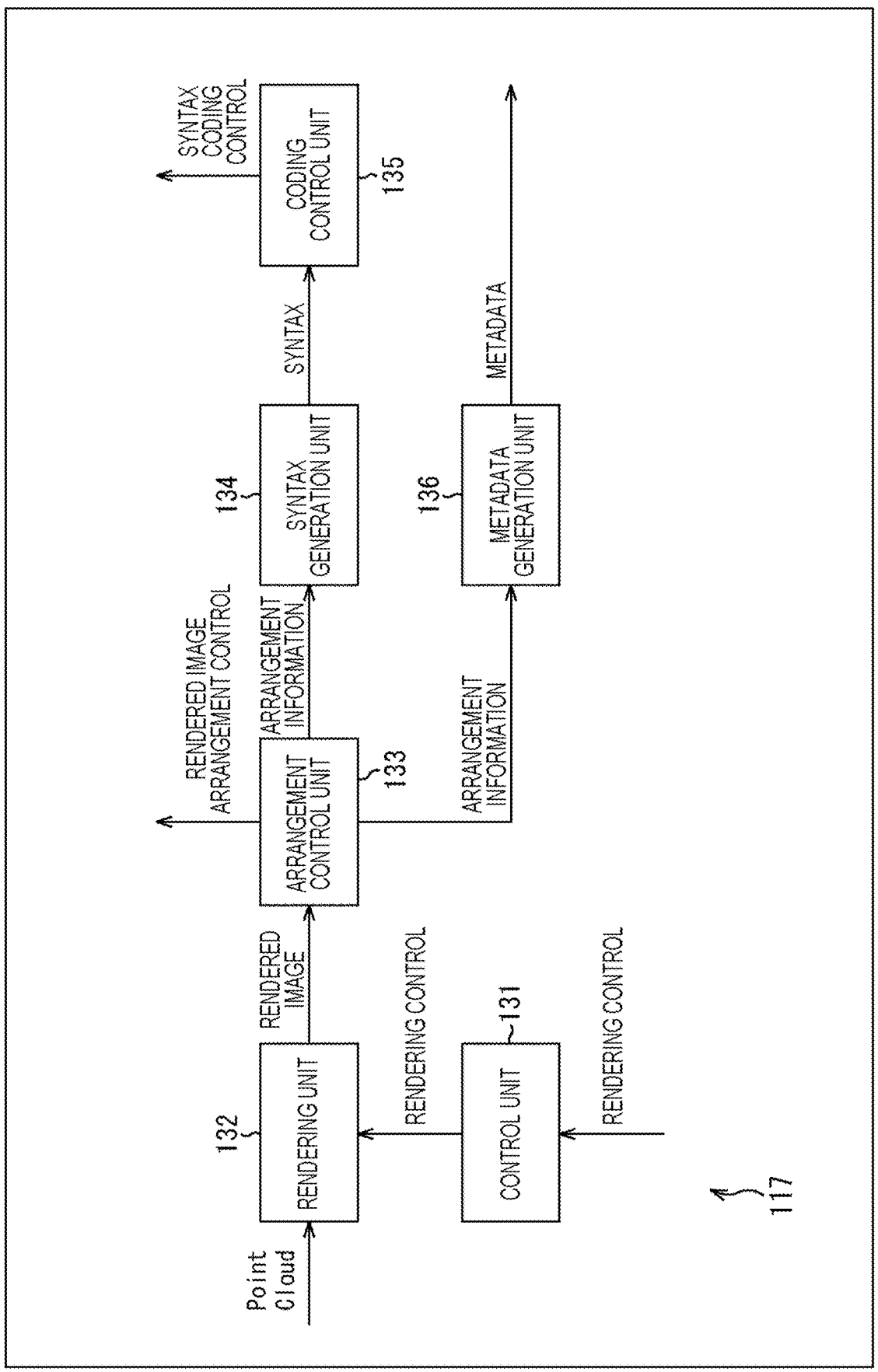
FIG. 9 is a block diagram illustrating an example of a main configuration of a 2D data generation unit.

FIG. 9 is a block diagram illustrating an example of a main configuration of the 2D data generation unit 117 in FIG. 8. As illustrated in FIG. 9, the 2D data generation unit 117 includes a control unit 131, a rendering unit 132, an arrangement control unit 133, a syntax generation unit 134, a coding control unit 135, and a metadata generation unit 136.

The control unit 131 performs processing related to rendering control. For example, the control unit 131 receives information regarding rendering control (e.g., a control command) input from outside such as a user, and controls the rendering unit 132 in accordance with the information.

The rendering unit 132 performs processing related to rendering. For example, the rendering unit 132 acquires a point cloud (3D data) input to the coding device 100. Furthermore, the rendering unit 132 renders, under the control of the control unit 131, an object having a three-dimensional shape represented by the point cloud, and generates a rendered image (2D data). The rendering unit 132 supplies the generated rendered image to the arrangement control unit 133.

The arrangement control unit 133 performs processing related to controlling of arrangement of a rendered image. For example, the arrangement control unit 133 acquires a rendered image supplied by the rendering unit 132. Furthermore, the arrangement control unit 133 supplies the rendered image to the packing unit 112. Moreover, the arrangement control unit 133 controls the packing unit 112 to arrange the rendered image at a predetermined position in a color video frame. The arrangement control unit 133 supplies the syntax generation unit 134 and the metadata generation unit 136 with arrangement information that indicates the spatial and temporal position where the rendered image (2D data) has been arranged.

The syntax generation unit 134 performs processing related to syntax generation. For example, the syntax generation unit 134 generates syntax on the basis of arrangement information supplied from the arrangement control unit 133. For example, the syntax generation unit 134 generates syntax that includes two-dimensional image spatial position management information, two-dimensional image temporal position management information, or the like. The syntax generation unit 134 supplies the generated syntax to the coding control unit 135.

The coding control unit 135 performs processing related to controlling of encoding of a color video frame. For example, the coding control unit 135 acquires syntax supplied from the syntax generation unit 134. Furthermore, the coding control unit 135 controls the video coding unit 115 to encode a color video frame with desired specifications. For example, the coding control unit 135 controls the video coding unit 115 to encode 2D data added to the color video frame as an independently decodable coding unit (e.g., a tile, a slice, or a picture). Furthermore, the coding control unit 135 supplies an acquired syntax (two-dimensional image spatial position management information, two-dimensional image temporal position management information, or the like) to the video coding unit 115, and the acquired syntax is added to a bitstream of a color video frame.

The metadata generation unit 136 performs processing related to metadata generation. For example, the metadata generation unit 136 generates metadata on the basis of arrangement information supplied from the arrangement control unit 133. For example, the metadata generation unit 136 generates metadata that includes two-dimensional image presence/absence identification information, two-dimensional image reproduction assisting information, or the like. The metadata generation unit 136 supplies the generated metadata to the multiplexer 118.

<Flow of Coding Processing>

Next, an example of a flow of coding processing executed by the coding device 100 will be described with reference to a flowchart in FIG. 10.

When the coding processing is started, the 2D data generation unit 117 of the coding device 100 executes 2D data generation processing to generate 2D data in step S101.

In step S102, the patch decomposition unit 111 projects an input point cloud onto a two-dimensional plane, and decomposes the point cloud into patches. Furthermore, the patch decomposition unit 111 generates auxiliary patch information for the decomposition.

In step S103, the auxiliary patch information compression unit 113 compresses (encodes) the auxiliary patch information generated in step S102.

In step S104, the packing unit 112 arranges each patch of position information and attribute information generated in step S102 on a two-dimensional image, and packs the patches as a video frame. Furthermore, the packing unit 112 generates an occupancy map. Moreover, the packing unit 112 performs dilation processing on a color video frame. Furthermore, the packing unit 112 generates control information regarding such packing.

In step S105, the packing unit 112 is controlled by the 2D data generation unit 117 to embed (add) the 2D data generated in step S101 into the color video frame generated in step S104.

In step S106, the video coding unit 114 encodes the geometry video frame generated in step S104, by an encoding method for two-dimensional images.

In step S107, the video coding unit 115 encodes the color video frame generated in step S104 (including the color video frame to which the 2D data has been added in step S105), by the encoding method for two-dimensional images.

In step S108, the OMap coding unit 116 encodes the occupancy map (or auxiliary info) generated in step S104, by a predetermined encoding method.

In step S109, the multiplexer 118 multiplexes the coded data generated in each of step S106 to step S108, and generates a bitstream that includes them (a bitstream of 3D data to which the 2D data has been added).

In step S110, the multiplexer 118 adds, to the bitstream generated in step S109, metadata that includes information regarding the 2D data generated in step S101.

In step S111, the multiplexer 118 outputs the bitstream generated in step S110 to the outside of the coding device 100.

When the processing of step S111 ends, the point cloud coding processing ends.

<Flow of 2D Data Generation Processing>

Next, an example of a flow of the 2D data generation processing executed in step S101 of FIG. 10 will be described with reference to a flowchart in FIG. 11.

When the 2D data generation processing is started, the control unit 131 of the 2D data generation unit 117 receives rendering control information, which is information regarding rendering control, in step S131.

In step S132, the rendering unit 132 generates a rendered image by rendering an object having a three-dimensional shape represented by a point cloud input to the coding device 100 on the basis of the rendering control information received in step S131.

In step S133, the arrangement control unit 133 supplies the rendered image generated in step S132 to the packing unit 112, and controls the packing unit 112 to arrange the rendered image at a desired position in a color video frame. This processing is executed corresponding to the processing of step S104 in FIG. 10.

In step S134, the syntax generation unit 134 generates desired syntax on the basis of arrangement information that indicates the position where the rendered image has been arranged in step S133.

In step S135, the coding control unit 135 controls the video coding unit 115 on the basis of the arrangement information, and controls encoding of the color video frame. That is, the coding control unit 135 encodes the color video frame with desired specifications and generates a bitstream.

In step S136, the coding control unit 135 controls the video coding unit 115 to add the syntax generated in step S134 to the bitstream of the color video frame generated in step S135.

Figure 10:
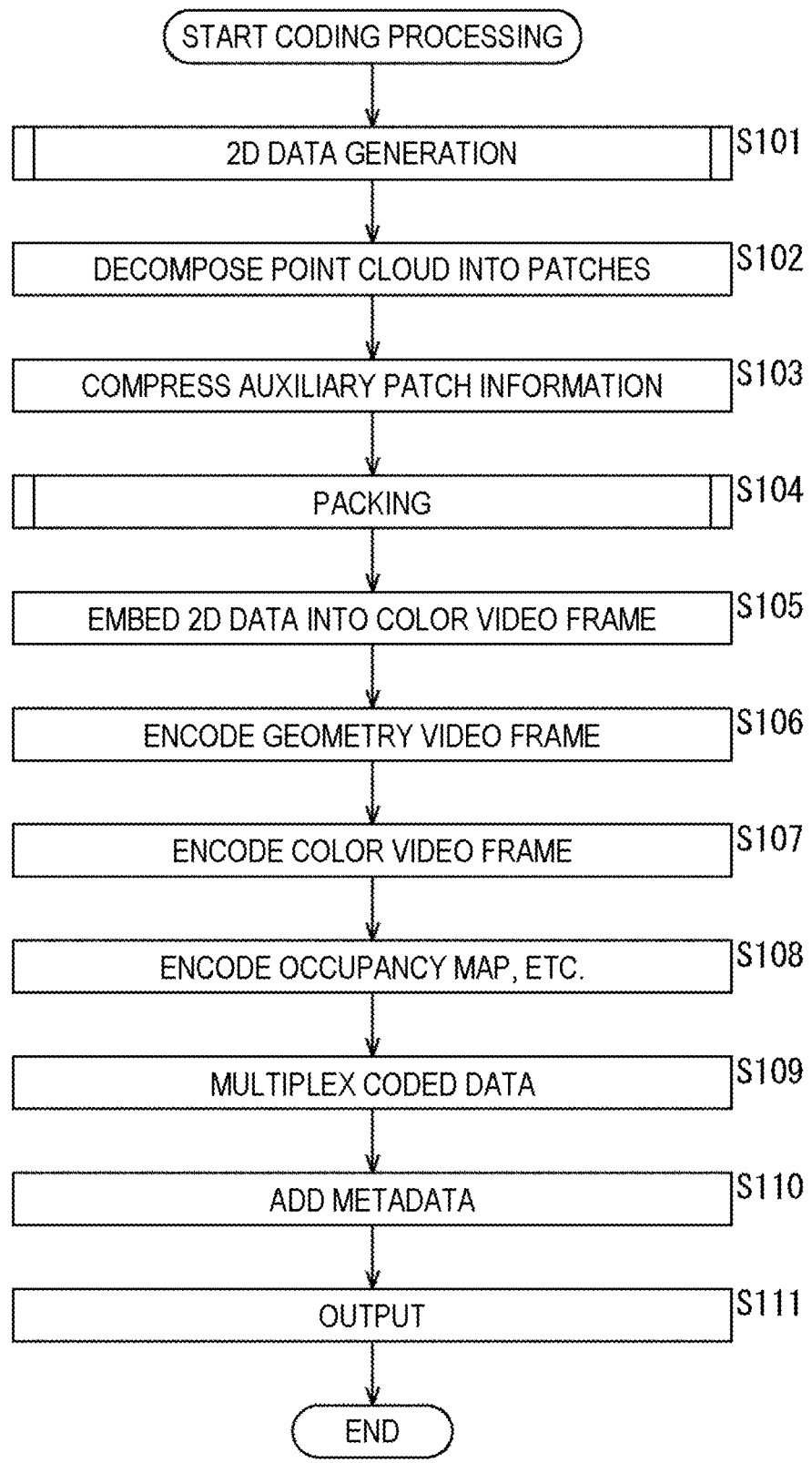
FIG. 10 is a flowchart illustrating an example of a flow of coding processing.
Figure 11:
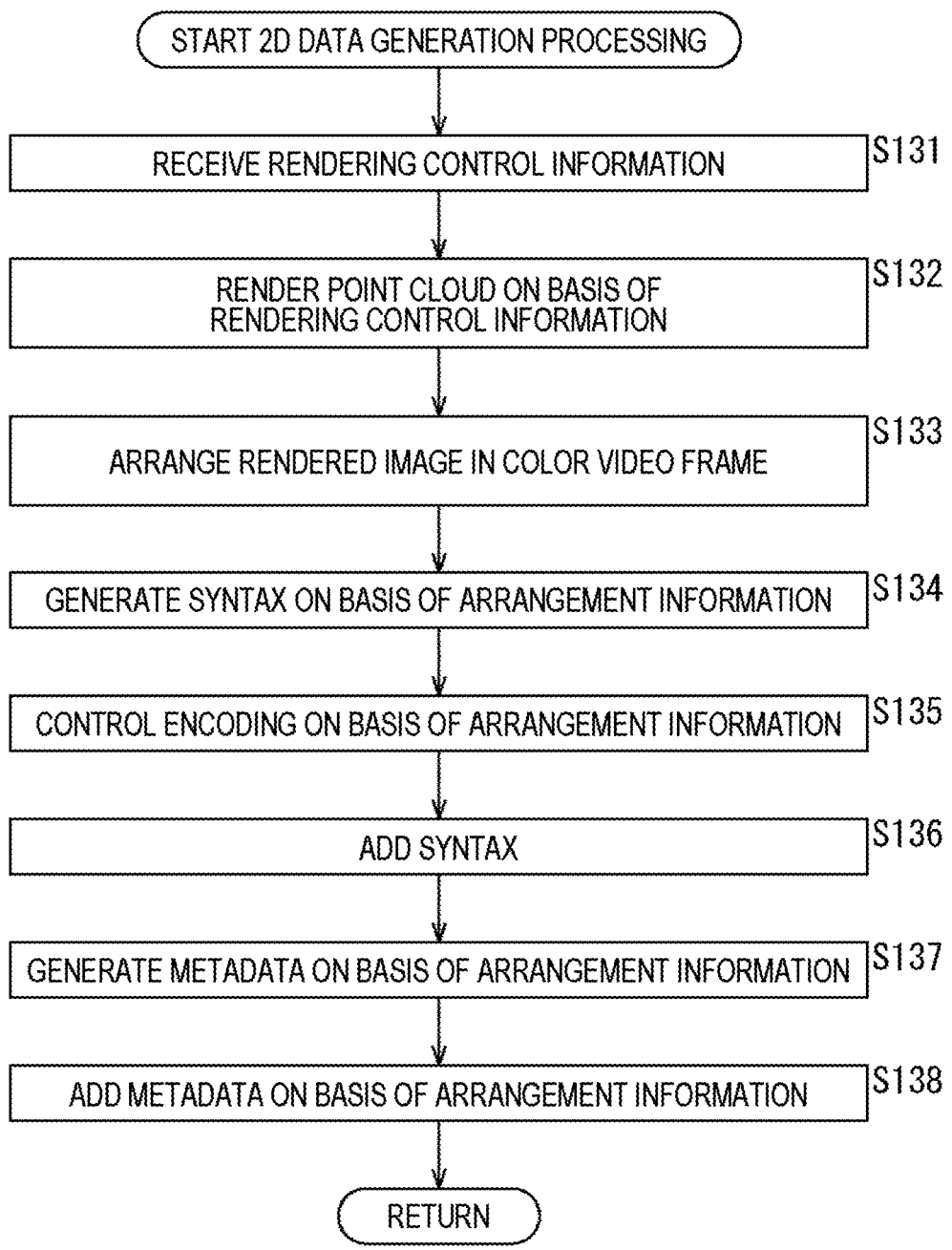
FIG. 11 is a flowchart illustrating an example of a flow of 2D data generation processing.

Note that each piece of processing of step S135 and step S136 is executed corresponding to the processing of step S107 in FIG. 10.

In step S137, the metadata generation unit 136 generates desired metadata on the basis of the arrangement information that indicates the position where the rendered image has been arranged in step S133.

In step S138, the metadata generation unit 136 supplies the metadata generated in step S137 to the multiplexer 118, and the metadata is added to the bitstream generated in step S109. Note that this processing is executed corresponding to the processing of step S110 in FIG. 10.

When the processing of step S138 ends, the 2D data generation processing ends, and the processing returns to FIG. 10.

By executing each piece of processing as described above, the coding device 100 can generate a bitstream of 3D data to which 2D data has been added. Consequently, on the decoding side, the coding device 100 can display a two-dimensional image (reproduce 2D data included in a bitstream) without rendering an object having a three-dimensional shape, as described above in <1. Addition of 2D data>. That is, a two-dimensional image can be reproduced more easily.

3. Second Embodiment

<Decoding Device>

Figure 12:
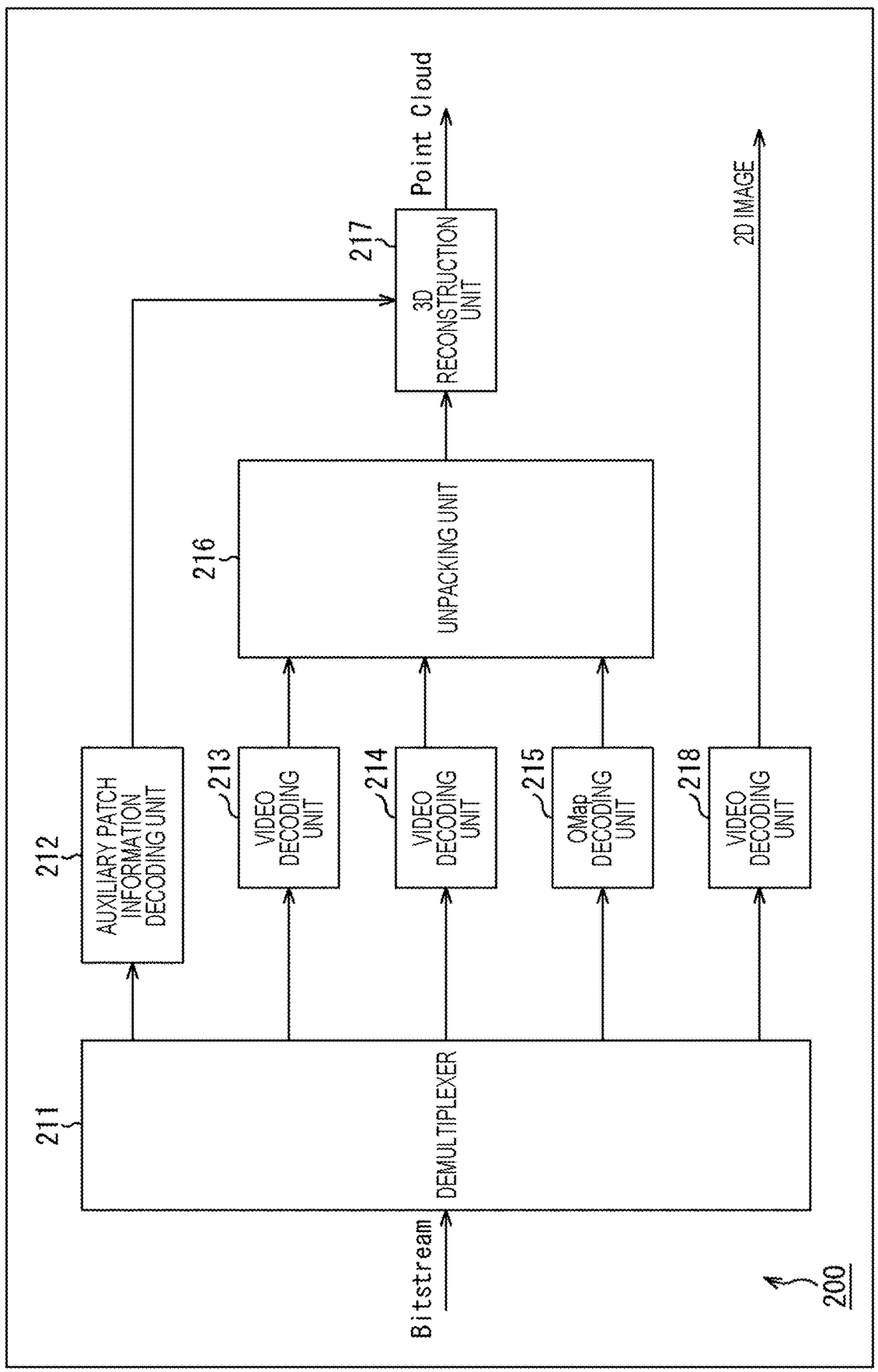
FIG. 12 is a block diagram illustrating an example of a main configuration of a decoding device.

FIG. 12 is a block diagram illustrating an example of a configuration of a decoding device, which is an aspect of an image processing apparatus to which the present technology is applied. A decoding device 200 illustrated in FIG. 12 is a device (a decoding device to which a video-based approach is applied) that decodes, by a decoding method for two-dimensional images, coded data obtained by projecting 3D data such as a point cloud onto a two-dimensional plane and encoding the 3D data, and reconstructs the 3D data. For example, the decoding device 200 decodes a bitstream generated by encoding of 3D data by the coding device 100 (FIG. 8) (a bitstream of the 3D data to which 2D data has been added), and reconstructs the 3D data. Furthermore, the decoding device 200 decodes coded data of the 2D data included in the bitstream, and generates 2D data without performing rendering.

Note that FIG. 12 illustrates a main part of processing units, a data flow, and the like, and not all of them are illustrated in FIG. 12. That is, the decoding device 200 may include a processing unit that is not illustrated as a block in FIG. 12, or may involve a flow of processing or data that is not illustrated as an arrow or the like in FIG. 12.

As illustrated in FIG. 12, the decoding device 200 includes a demultiplexer 211, an auxiliary patch information decoding unit 212, a video decoding unit 213, a video decoding unit 214, an OMap decoding unit 215, an unpacking unit 216, a 3D reconstruction unit 217, and a video decoding unit 218.

The demultiplexer 211 performs processing related to data demultiplexing. For example, the demultiplexer 211 acquires a bitstream input to the decoding device 200. This bitstream is supplied from, for example, the coding device 100. The demultiplexer 211 demultiplexes this bitstream, extracts coded data of auxiliary patch information, and supplies it to the auxiliary patch information decoding unit 212. Furthermore, the demultiplexer 211 extracts coded data of a geometry video frame (e.g., a GOF geometry video stream 52) from a bitstream by demultiplexing, and supplies it to the video decoding unit 213.

Moreover, the demultiplexer 211 extracts coded data of a color video frame (e.g., a GOF texture video stream 54) from a bitstream by demultiplexing, and supplies it to the video decoding unit 214. Furthermore, the demultiplexer 211 extracts coded data of an occupancy map or the like (e.g., GOF auxiliary info & occupancy maps 53) from a bitstream by demultiplexing, and supplies it to the OMap decoding unit 215.

Moreover, the demultiplexer 211 extracts control information regarding packing from a bitstream by demultiplexing, and supplies it to the unpacking unit 216 (not illustrated).

Furthermore, on the basis of metadata included in a bitstream (e.g., 2D control syntax 71), the demultiplexer 211 extracts, from a bitstream, a bitstream of a color video frame including 2D data (e.g., the GOF texture video stream 54), and supplies the extracted bitstream to the video decoding unit 218.

The auxiliary patch information decoding unit 212 performs processing related to decoding of coded data of auxiliary patch information. For example, the auxiliary patch information decoding unit 212 acquires coded data of auxiliary patch information supplied from the demultiplexer 211. Furthermore, the auxiliary patch information decoding unit 212 decodes (decompresses) the coded data of the auxiliary patch information included in the acquired data. The auxiliary patch information decoding unit 212 supplies the auxiliary patch information obtained by decoding to the 3D reconstruction unit 217.

The video decoding unit 213 performs processing related to decoding of coded data of a geometry video frame. For example, the video decoding unit 213 acquires coded data of a geometry video frame supplied from the demultiplexer 211. The video decoding unit 213 decodes the coded data of the geometry video frame by an optional decoding method for two-dimensional images such as AVC or HEVC. The video decoding unit 213 supplies the geometry video frame obtained by the decoding to the unpacking unit 216.

The video decoding unit 214 performs processing related to decoding of coded data of a color video frame. For example, the video decoding unit 214 acquires coded data of a color video frame supplied from the demultiplexer 211. The video decoding unit 214 decodes the coded data of the color video frame by an optional decoding method for two-dimensional images such as AVC or HEVC. The video decoding unit 214 supplies the color video frame obtained by the decoding to the unpacking unit 216.

The OMap decoding unit 215 performs processing related to decoding of coded data of an occupancy map or the like. For example, the OMap decoding unit 215 acquires coded data of an occupancy map or the like supplied from the demultiplexer 211. The OMap decoding unit 215 decodes the coded data of the occupancy map or the like by an optional decoding method corresponding to the encoding method used for the coded data. The OMap decoding unit 215 supplies information such as the occupancy map obtained by the decoding to the unpacking unit 216.

The unpacking unit 216 performs processing related to unpacking. For example, the unpacking unit 216 acquires a geometry video frame from the video decoding unit 213, acquires a color video frame from the video decoding unit 214, and acquires information such as an occupancy map from the OMap decoding unit 215. Furthermore, the unpacking unit 216 unpacks a geometry video frame or a color video frame on the basis of control information regarding packing or information such as an occupancy map, and extracts a patch (geometry patch) of position information (geometry), a patch (texture patch) of attribute information (texture), or the like from the video frame.

Here, the occupancy map does not include information regarding 2D data, and the unpacking unit 216 can therefore ignore 2D data included in the color video frame and extract only the texture patch from the color video frame. That is, the unpacking unit 216 can easily perform unpacking as in a case of a bitstream to which 2D data has not been added.

The unpacking unit 216 supplies the geometry patch, the texture patch, the occupancy map, and the like obtained by unpacking as described above to the 3D reconstruction unit 217.

The 3D reconstruction unit 217 performs processing related to reconstruction of a point cloud. For example, the 3D reconstruction unit 217 reconstructs a point cloud on the basis of auxiliary patch information supplied from the auxiliary patch information decoding unit 212, and information such as a geometry patch, a texture patch, and an occupancy map supplied from the unpacking unit 216. The 3D reconstruction unit 217 outputs the reconstructed point cloud to outside of the decoding device 200 (e.g., the 3D display 35).

The video decoding unit 218 performs processing related to decoding of coded data of 2D data included in coded data of a color video frame. For example, the video decoding unit 218 acquires coded data of a color video frame supplied from the demultiplexer 211. The video decoding unit 218 decodes coded data of 2D data included in the coded data (e.g., the GOF texture video stream 54) of the color video frame by an optional decoding method for two-dimensional images such as AVC or HEVC. The video decoding unit 218 outputs 2D data (e.g., a rendered image) obtained by the decoding to the outside of the decoding device 200 (e.g., the 2D display 36).

With such a configuration, the decoding device 200 can display a two-dimensional image (reproduce 2D data included in a bitstream) without rendering an object having a three-dimensional shape, as described above in <1. Addition of 2D data>. That is, a two-dimensional image can be reproduced more easily.

<Flow of Point Cloud Decoding Processing>

Figure 13:
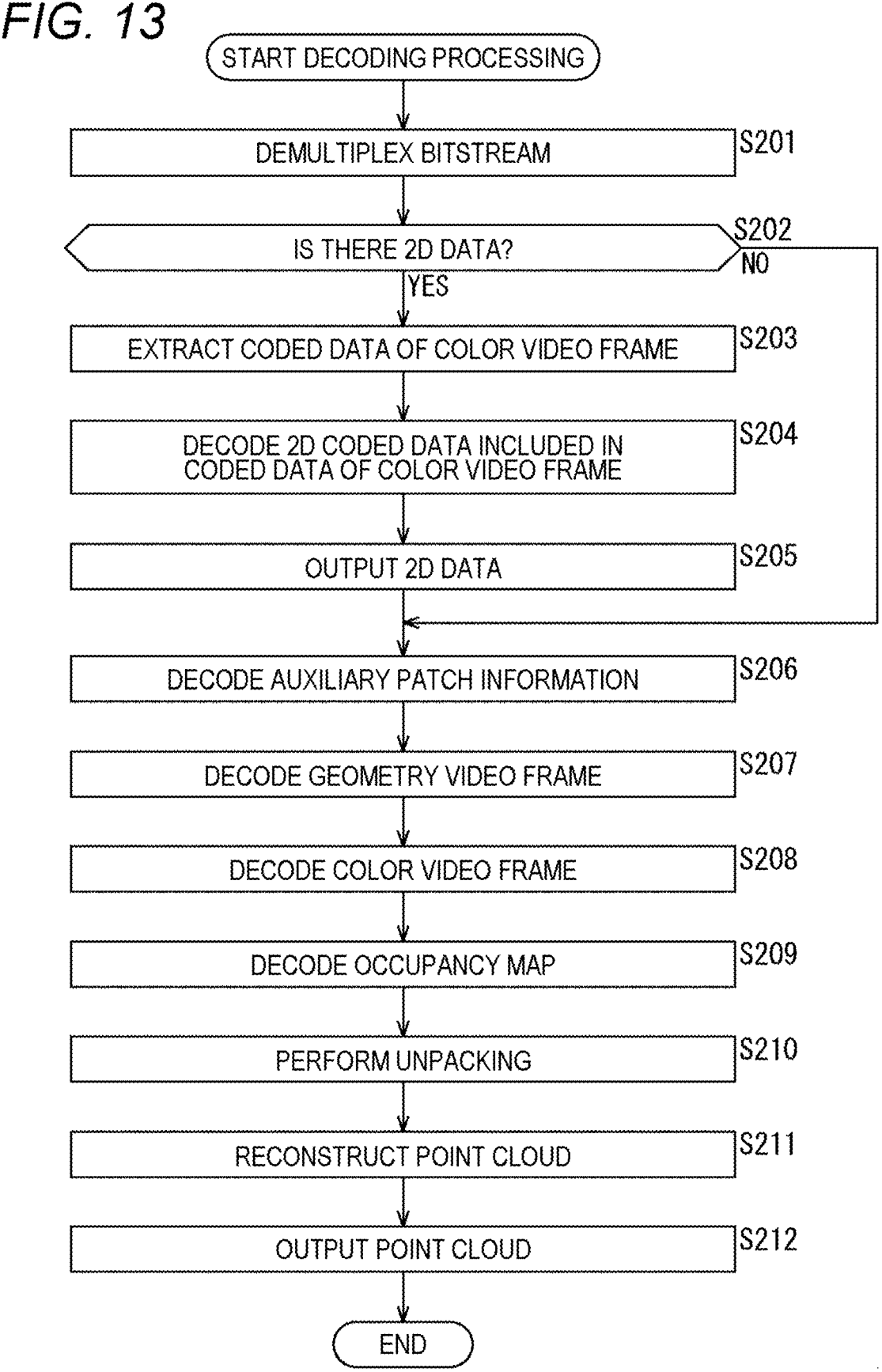
FIG. 13 is a flowchart illustrating an example of a flow of decoding processing.

Next, an example of a flow of decoding processing executed by the decoding device 200 will be described with reference to a flowchart in FIG. 13.

When the decoding processing is started, the demultiplexer 211 demultiplexes a bitstream input to the decoding device 200 in step S201.

In step S202, the demultiplexer 211 determines whether or not there is 2D data in the bitstream on the basis of 2D control syntax. For example, if thumbnail_available_flag of the 2D control syntax is true and it is determined that 2D data has been added, the processing proceeds to step S203.

In step S203, the demultiplexer 211 extracts coded data of a color video frame (GOF texture video stream) from the bitstream input to the decoding device 200.

In step S204, the video decoding unit 218 decodes coded data of 2D data (2D coded data) included in the coded data of the color video frame (GOF texture video stream) extracted in step S203. Note that, in a case where the coded data of the color video frame can be partially decoded, the video decoding unit 218 decodes only the portion where the 2D data is included. For example, in a case where the 2D data has been encoded in an independently decodable coding unit such as a tile, a slice, or a picture, the video decoding unit 218 decodes only the portion in the coding unit.

In step S205, the video decoding unit 218 outputs 2D data generated by decoding as described above to the outside of the decoding device 200.

When the processing of step S205 ends, the processing proceeds to step S206. Furthermore, if it is determined in step S202 that 2D data has not been added, the processing proceeds to step S206.

In step S206, the auxiliary patch information decoding unit 212 decodes auxiliary patch information extracted from the bitstream in step S201.

In step S207, the video decoding unit 213 decodes coded data of a geometry video frame (position information video frame) extracted from the bitstream in step S201.

In step S208, the video decoding unit 214 decodes coded data of a color video frame (attribute information video frame) extracted from the bitstream in step S201.

In step S209, the OMap decoding unit 215 decodes coded data of an occupancy map or the like extracted from the bitstream in step S201.

In step S210, the unpacking unit 216 performs unpacking. For example, the unpacking unit 216 unpacks the geometry video frame obtained by decoding of the coded data in step S207 on the basis of information such as the occupancy map obtained by decoding of the coded data in step S209, and generates a geometry patch. Furthermore, the unpacking unit 216 unpacks the color video frame obtained by decoding of the coded data in step S208 on the basis of information such as the occupancy map obtained by decoding of the coded data in step S209, and generates a texture patch.

In step S211, the 3D reconstruction unit 217 reconstructs a point cloud (object having a three-dimensional shape) on the basis of the auxiliary patch information obtained in step S206, and the geometry patch, the texture patch, the occupancy map, and the like obtained in step S210.

In step S212, the 3D reconstruction unit 217 outputs the reconstructed point cloud to the outside of the decoding device 200.

When the processing of step S212 ends, the decoding processing ends.

By executing each piece of processing as described above, the decoding device 200 can display a two-dimensional image (reproduce 2D data included in a bitstream) without rendering an object having a three-dimensional shape, as described above in <1. Addition of 2D data>. That is, a two-dimensional image can be reproduced more easily.

4. Third Embodiment

<Decoding Device>

In FIG. 12, the decoding device 200 has been described as having the video decoding unit 218 in addition to the video decoding unit 214. Both the video decoding unit 214 and the video decoding unit 218 are processing units that decode coded data of a color video frame. That is, they are decoding units having functions similar to each other. Consequently, the processing to be performed by the video decoding unit 214 and the processing to be performed by the video decoding unit 218 may be performed by one video decoding unit.

FIG. 14 is a block diagram illustrating an example of a main configuration of the decoding device 200 in that case. In the case of the example in FIG. 14, the decoding device 200 basically has a configuration similar to that in the case of FIG. 12, but includes, unlike the case of FIG. 12, a video decoding unit 221 instead of the video decoding unit 214 and the video decoding unit 218.

The video decoding unit 221 performs both the processing to be performed by the video decoding unit 214 and the processing to be performed by the video decoding unit 218. For example, the video decoding unit 221 acquires coded data of a color video frame supplied from a demultiplexer 211, decodes the coded data of the color video frame by an optional decoding method for two-dimensional images such as AVC or HEVC, and supplies the color video frame obtained by the decoding to an unpacking unit 216.

Furthermore, for example, the video decoding unit 221 decodes coded data of 2D data included in the acquired coded data of the color video frame by an optional decoding method for two-dimensional images such as AVC or HEVC, and outputs 2D data obtained by the decoding (e.g., a rendered image) to outside of the decoding device 200 (e.g., the 2D display 36).

Thus, the configuration of the decoding device 200 can be simplified as compared with that in the case of FIG. 12. That is, it is possible to suppress an increase in circuit scale of the decoding device 200.

Note that the flow of decoding processing is similar to that described with reference to the flowchart in FIG. 13, and the description thereof will be omitted.

5. Note

<Computer>

The series of pieces of processing described above can be executed not only by hardware but also by software. In a case where the series of pieces of processing is executed by software, a program constituting the software is installed on a computer. Here, the computer includes a computer incorporated in dedicated hardware, or a general-purpose personal computer capable of executing various functions with various programs installed therein, for example.

FIG. 15 is a block diagram illustrating a configuration example of hardware of a computer that executes the series of pieces of processing described above in accordance with a program.

In a computer 900 illustrated in FIG. 15, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, or the like. The output unit 912 includes, for example, a display, a speaker, an output terminal, or the like. The storage unit 913 includes, for example, a hard disk, a RAM disk, a nonvolatile memory, or the like. The communication unit 914 includes, for example, a network interface. The drive 915 drives a removable medium 921 such as a magnetic disk, an optical disk, a magneto-optical disk, or a semiconductor memory.

To perform the series of pieces of processing described above, the computer configured as described above causes the CPU 901 to, for example, load a program stored in the storage unit 913 into the RAM 903 via the input/output interface 910 and the bus 904 and then execute the program. The RAM 903 also stores, as appropriate, data or the like necessary for the CPU 901 to execute various types of processing.

The program to be executed by the computer (CPU 901) can be provided by, for example, being recorded on the removable medium 921 as a package medium or the like. In that case, inserting the removable medium 921 into the drive 915 allows the program to be installed into the storage unit 913 via the input/output interface 910.

Furthermore, the program can also be provided via a wired or wireless transmission medium such as a local area network, the Internet, or digital satellite broadcasting. In that case, the program can be received by the communication unit 914 and installed into the storage unit 913.

In addition, the program can also be installed in advance in the ROM 902 or the storage unit 913.

<Applicable Targets of Present Technology>

The above description shows a case where the present technology is applied to encoding/decoding of point cloud data, but the present technology is not limited to these examples, and can be applied to encoding/decoding of 3D data of any standard. That is, the various types of processing such as encoding/decoding methods and the various types of data such as 3D data and metadata may have any specifications, as long as the specifications do not contradict the present technology described above. Furthermore, some of the pieces of processing and specifications described above may be omitted as long as the omission does not contradict the present technology.

The present technology can be applied to any configuration. For example, the present technology can be applied to a variety of electronic devices such as a transmitter or a receiver (e.g., a television receiver or a mobile phone) for satellite broadcasting, wired broadcasting such as cable TV, distribution on the Internet, distribution to a terminal by cellular communication, or the like, or a device (e.g., a hard disk recorder or a camera) that records an image on a medium such as an optical disk, a magnetic disk, or a flash memory, and reproduces an image from such a storage medium.

Furthermore, for example, the present technology can also be carried out as a configuration of a part of a device such as a processor (e.g., a video processor) as a system large scale integration (LSI) or the like, a module (e.g., a video module) using a plurality of processors or the like, a unit (e.g., a video unit) using a plurality of modules or the like, or a set (e.g., a video set) in which other functions have been added to a unit.

Furthermore, for example, the present technology can also be applied to a network system constituted by a plurality of devices. For example, the present technology may be carried out as cloud computing in which a plurality of devices shares and jointly performs processing via a network. For example, the present technology may be carried out in a cloud service that provides services related to images (moving images) to an optional terminal such as a computer, an audio visual (AV) device, a portable information processing terminal, or an Internet of Things (IoT) device.

Note that, in the present specification, a system means a set of a plurality of components (devices, modules (parts), and the like), and it does not matter whether or not all components are in the same housing. Thus, a plurality of devices housed in separate housings and connected via a network, and one device having a plurality of modules housed in one housing are both systems.

<Fields and Uses to which Present Technology can be Applied>

Systems, devices, processing units, and the like to which the present technology is applied can be used in any field such as transportation, medical care, crime prevention, agriculture, livestock industry, mining, beauty, factories, home appliances, weather, or nature monitoring. Furthermore, they can be used for any intended use.

<Others>

Note that, in the present specification, a "flag" is information for identifying a plurality of situations, and includes not only information used for identifying two situations, true (1) and false (0), but also information that enables identification of three or more situations. Consequently, the number of values that this "flag" can take may be two such as "1" and "0", or may be three or more. That is to say, the number of bits constituting this "flag" is optional, and may be one bit or may be a plurality of bits. Furthermore, assumption of identification information (including a flag) includes not only a case where the identification information is included in a bitstream but also a case where difference information between the identification information and a certain piece of information serving as a reference is included in a bitstream. Thus, in the present specification, a "flag" and "identification information" include not only the information but also difference information between the information and a piece of information serving as a reference.

Furthermore, the various types of information (metadata or the like) regarding coded data (bitstream) may be transmitted or recorded in any form as long as it is associated with the coded data. Here, the term "associated with" means, for example, allowing one piece of data to be used (linked) when another piece of data is processed. That is, pieces of data associated with each other may be combined as one piece of data, or may be treated as separate pieces of data. For example, information associated with coded data (image) may be transmitted via a transmission path different from that of the coded data (image). Furthermore, for example, information associated with coded data (image) may be recorded on a recording medium different from that where the coded data (image) is recorded (or in a different recording area in the same recording medium). Note that this "associated with" may indicate association with not the entire data but a part of the data. For example, an image and information corresponding to the image may be associated with each other by any unit such as a plurality of frames, one frame, or a part of a frame.

Note that, in the present specification, terms such as "synthesize", "multiplex", "add", "integrate", "include", "store" "put into", "merge", and "insert" mean combining a plurality of objects into one, for example, combining coded data and metadata into one piece of data, and means one method of "associated with" described above.

Furthermore, embodiments of the present technology are not limited to the embodiments described above but can be modified in various ways within a scope of the present technology.

For example, a configuration described as one device (or processing unit) may be divided and configured as a plurality of devices (or processing units). Conversely, configurations described above as a plurality of devices (or processing units) may be combined and configured as one device (or processing unit). Furthermore, as a matter of course, a configuration other than those described above may be added to the configurations of the devices (or the processing units). Moreover, as long as the configuration and operation of the entire system remain substantially the same, a part of the configuration of a certain device (or processing unit) may be included in the configuration of another device (or another processing unit).

Furthermore, for example, the program described above may be executed by any device. In that case, the device is only required to have necessary functions (functional blocks and the like) and be able to obtain necessary information.

Furthermore, for example, the steps of one flowchart may be executed by one device, or may be shared and executed by a plurality of devices. Moreover, in a case where a plurality of pieces of processing is included in one step, the plurality of pieces of processing may be executed by one device, or may be shared and executed by a plurality of devices. In other words, a plurality of pieces of processing included in one step may be processed as a plurality of steps. Conversely, processing described as a plurality of steps may be collectively executed as one step.

Furthermore, for example, the program to be executed by the computer may be configured so that the steps described are processed in chronological order as described in the present specification, or the steps are processed in parallel or processed individually when needed, for example, when a call is made. That is, as long as no contradiction arises, the steps may be processed in an order different from the order described above. Moreover, the program may be configured so that processing of the steps described is executed in parallel with processing of another program, or executed in combination with processing of another program.

Furthermore, for example, a plurality of technologies related to the present technology can each be carried out independently and individually as long as no contradiction arises. As a matter of course, any two or more technologies related to the present technology may be used together and carried out. For example, some or all of the technologies related to the present technology described in any one of the embodiments may be carried out in combination with some or all of the technologies related to the present technology described in another embodiment. Furthermore, some or all of any of the technologies related to the present technology described above may be carried out in combination with another technology that is not described above.

REFERENCE SIGNS LIST 21 3D data encoder
22 Renderer
31 Demultiplexer
32 3D data decoder
33 2D video decoder
34 Renderer
35 3D display
36 2D display
40 Bitstream
41 Stream header
42 GOF stream
100 Coding device
111 Patch decomposition unit
112 Packing unit
113 Auxiliary patch information compression unit
114 Video coding unit
115 Video coding unit
116 OMap coding unit
117 2D data generation unit
118 Multiplexer
131 Control unit
132 Rendering unit
133 Arrangement control unit
134 Syntax generation unit
135 Coding control unit
136 Metadata generation unit
200 Decoding device
211 Demultiplexer
212 Auxiliary patch information decoding unit
213 Video decoding unit
214 Video decoding unit
215 OMap decoding unit
216 Unpacking unit
217 3D reconstruction unit
218 Video decoding unit
221 Video decoding unit

The invention claimed is:

1. An image processing apparatus comprising:
circuitry configured to
generate a video frame that includes a patch obtained by projecting, onto a two dimensional plane, a point cloud that represents an object having a three-dimensional shape as a group of points;
generate a thumbnail two-dimensional image, the thumbnail two-dimensional image being generated independently from the patch;
embed the thumbnail two-dimensional image into the video frame, the thumbnail two-dimensional image being arranged along the patch with an offset; and encode the video frame, as coded data of the video frame including the thumbnail two-dimensional image, to generate a bitstream, in which the coded data of the video frame is decoded to reconstruct the point cloud at a decoding device and the thumbnail two-dimensional image is extracted from the bitstream and decoded to display at the decoding device independently from reconstruction of the point cloud.

2. The image processing apparatus according to claim 1, wherein
the thumbnail two-dimensional image is a rendered image obtained by rendering the object.

3. The image processing apparatus according to claim 2, wherein
the rendered image is an image obtained by rendering just like imaging the object from a recommended camera position and direction.

4. The image processing apparatus according to claim 3, wherein
the circuitry is configured to generate a moving image constituted by the video frame including a plurality of the rendered images, which are moving images, and
the circuitry is configured to encode the moving image to generate the bitstream.

5. The image processing apparatus according to claim 4, wherein
the plurality of the rendered images, which are moving images, are rendered images obtained by rendering the object with the same camera work as each other.

6. The image processing apparatus according to claim 1, wherein
the circuitry is configured to generate a color video frame that includes the patch obtained by projecting attribute information of the point cloud onto the two-dimensional plane and the thumbnail two-dimensional image different from the patch.

7. The image processing apparatus according to claim 1, wherein
the circuitry is configured to encode the video frame in a multi layered structure, and
the circuitry is configured to generate a moving image that includes the thumbnail two-dimensional image in the video frame of some of layers in the multi-layered structure.

8. The image processing apparatus according to claim 1, wherein
the circuitry is configured to encode the video frame in a multi layered structure, and
the circuitry is configured to generate a moving image that includes the thumbnail two-dimensional image in the video frame of all layers in the multi-layered structure.

9. The image processing apparatus according to claim 1, wherein
the circuitry is configured to generate the bitstream that further includes information regarding the thumbnail two-dimensional image.

10. The image processing apparatus according to claim 9, wherein
the information regarding the thumbnail two-dimensional image includes two-dimensional image presence/absence identification information that indicates whether or not the bitstream includes data of the thumbnail two-dimensional image.

11. The image processing apparatus according to claim 9, wherein
the information regarding the thumbnail two-dimensional image includes two-dimensional image spatial position management information for managing a position in a spatial direction of the thumbnail two-dimensional image.

12. The image processing apparatus according to claim 9, wherein
the information regarding the thumbnail two-dimensional image includes two-dimensional image temporal position management information for managing a position in a time direction of the thumbnail two-dimensional image.

13. The image processing apparatus according to claim 9, wherein
the information regarding the thumbnail two-dimensional image includes two-dimensional image reproduction assisting information for assisting reproduction of the thumbnail two dimensional image.

14. The image processing apparatus according to claim 1, wherein
the circuitry is configured to encode the thumbnail two-dimensional image independently of the patch.

15. The image processing apparatus according to claim 14, wherein
the circuitry is configured to encode the thumbnail two-dimensional image by using a coding parameter for the thumbnail two-dimensional image.

16. The image processing apparatus according to claim 1, wherein
the thumbnail two-dimensional image is displayed as a content of the object without being rendered at a decoding process.

17. An image processing method comprising:
generating a video frame that includes a patch obtained by projecting, onto a two-dimensional plane, a point cloud that represents an object having a three dimensional shape as a group of points;
generating a thumbnail two-dimensional image, the thumbnail two-dimensional image being generated independently from the patch;
embedding the thumbnail two-dimensional image into the video frame, the thumbnail two-dimensional image being arranged along the patch with an offset; and
encoding the video frame, as coded data of the video frame including the thumbnail two-dimensional image, to generate a bitstream, in which the coded data of the video frame is decoded to reconstruct the point cloud at a decoding device and the thumbnail two-dimensional image is extracted from the bitstream and decoded to display at the decoding device independently from reconstruction of the point cloud.

18. An image processing apparatus comprising:
circuitry configured to
extract, from a bitstream that includes coded data of a video frame that includes a patch obtained by projecting, onto a two-dimensional plane, a point cloud that represents an object having a three-dimensional shape as a group of points, and a thumbnail two dimensional image which is generated independently from the patch and embedded into the video frame arranged along the patch with an offset;
decode the coded data of the video frame to reconstruct the point cloud; and
decode the coded data extracted from the bitstream to restore the thumbnail two-dimensional image, independently from reconstruction of the point cloud by decoding the coded data of the video frame.

19. An image processing method comprising:
extracting, from a bitstream that includes coded data of a video frame that includes a patch obtained by projecting, onto a two-dimensional plane, a point cloud that represents an object having a three-dimensional shape as a group of points, and a thumbnail two-dimensional image which is generated independently from the patch and embedded into the video frame arranged along the patch with an offset;
decoding the coded data of the video frame to reconstruct the point cloud; and
decoding the coded data extracted from the bitstream to restore the thumbnail two-dimensional image, independently from reconstruction of the point cloud by decoding the coded data of the video frame.

* * * * *